(12) United States Patent
Kim et al.

(10) Patent No.: US 12,087,307 B2
(45) Date of Patent: Sep. 10, 2024

(54) METHOD AND APPARATUS FOR PERFORMING SPEAKER DIARIZATION ON MIXED-BANDWIDTH SPEECH SIGNALS

(71) Applicant: SAMSUNG ELECTRONICS CO., LTD., Suwon-si (KR)

(72) Inventors: Myungjong Kim, Milpitas, CA (US); Vijendra Raj Apsingekar, San Jose, CA (US); Aviral Anshu, Santa Clara, CA (US); Taeyeon Ki, Milpitas, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 96 days.

(21) Appl. No.: 17/538,604

(22) Filed: Nov. 30, 2021

(65) Prior Publication Data

US 2023/0169981 A1 Jun. 1, 2023

(51) Int. Cl.
| | |
|---|---|
| *G10L 17/06* | (2013.01) |
| *G10L 17/02* | (2013.01) |
| *G10L 17/18* | (2013.01) |
| *G10L 21/0272* | (2013.01) |
| *G10L 21/0308* | (2013.01) |

(52) U.S. Cl.
CPC ............ *G10L 17/06* (2013.01); *G10L 17/02* (2013.01); *G10L 17/18* (2013.01); *G10L 21/0272* (2013.01); *G10L 21/0308* (2013.01)

(58) Field of Classification Search
CPC ......... G10L 17/06; G10L 17/02; G10L 17/18; G10L 21/0308; G10L 21/0272
See application file for complete search history.

(56) References Cited

U.S. PATENT DOCUMENTS

| | | | |
|---|---|---|---|
| 10,026,405 B2 | 7/2018 | Arslan et al. | |
| 10,504,504 B1 | 12/2019 | Meltzner et al. | |
| 10,559,311 B2 * | 2/2020 | Baughman | G10L 17/06 |
| 10,811,000 B2 | 10/2020 | Le Roux et al. | |
| 10,978,059 B2 | 4/2021 | Moreno et al. | |
| 11,341,973 B2 | 5/2022 | Kim et al. | |

(Continued)

FOREIGN PATENT DOCUMENTS

| | | |
|---|---|---|
| JP | 2000-330590 A | 11/2000 |
| KR | 10-2019-0092379 A | 8/2019 |

OTHER PUBLICATIONS

Hitoshi Yamamoto, Kong Aik Lee, Koji Okabe, Takafumi Koshinaka; Speaker Augmentation and Bandwidth Extension for Deep Speaker Embedding; NEC Corporation, Japan, Sep. 15-19, 2019, Graz, Austria (Year: 2019).*

(Continued)

*Primary Examiner* — Daniel C Washburn
*Assistant Examiner* — James Boggs
(74) *Attorney, Agent, or Firm* — Sughrue Mion, PLLC

(57) ABSTRACT

An apparatus for processing speech data may include a processor configured to: separate an input speech into speech signals; identify a bandwidth of each of the speech signals; extract speaker embeddings from the speech signals based on the bandwidth of each of the speech signals, using at least one neural network configured to receive the speech signals and output the speaker embeddings; and cluster the speaker embeddings into one or more speaker clusters, each speaker cluster corresponding to a speaker identity.

12 Claims, 23 Drawing Sheets

(56) References Cited

U.S. PATENT DOCUMENTS

| | | | |
|---|---|---|---|
| 11,373,672 | B2 | 6/2022 | Mesgarani et al. |
| 11,688,404 | B2* | 6/2023 | Wang .................. G10L 15/075 704/232 |
| 11,790,921 | B2* | 10/2023 | Perret .................... G10L 17/18 704/232 |
| 2007/0055516 | A1* | 3/2007 | Kakino .................. G10L 17/08 704/243 |
| 2018/0166066 | A1* | 6/2018 | Dimitriadis ............. G10L 25/78 |
| 2020/0152207 | A1* | 5/2020 | Wang ..................... G10L 17/18 |
| 2020/0219517 | A1 | 7/2020 | Wang et al. |
| 2020/0302939 | A1 | 9/2020 | Khoury et al. |
| 2020/0312334 | A1 | 10/2020 | Ziv et al. |
| 2021/0134316 | A1* | 5/2021 | Khoury .................. G10L 25/27 |
| 2021/0233511 | A1* | 7/2021 | Li ........................... G06N 3/04 |
| 2021/0407516 | A1 | 12/2021 | Yoshioka et al. |
| 2022/0114424 | A1* | 4/2022 | Quader ................ G06V 10/454 |
| 2022/0230648 | A1* | 7/2022 | Kwon ..................... G10L 17/08 |
| 2022/0375492 | A1* | 11/2022 | Grangier ................. G10L 15/07 |
| 2023/0089308 | A1* | 3/2023 | Wang ...................... G10L 15/26 704/232 |

OTHER PUBLICATIONS

Kong Aik Lee,a, Hitoshi Yamamotoa, Koji Okabea, Qiongqiong Wanga, Ling Guoa, Takafumi Koshinakaa, Jiacen Zhangb, Koichi Shinodab; NEC-TT System for Mixed-Bandwidth and Multi-Domain; Speaker Recognition; Nov. 13, 2019 (Year: 2019).*

Rahmani, Mahnaz, and Farbod Razzazi, "An LSTM Auto-Encoder for Single-Channel Speaker Attention System", Oct. 2019, 9th International Conference on Computer and Knowledge Engineering (ICCKE 2019), pp. 110-115. (Year: 2019).*

Mantena, Gautam, Ozlem Kalinli, Ossama Abdel-Hamid, and Don McAllaster, "Bandwidth Embeddings for Mixed-bandwidth Speech Recognition", Sep. 2019, Interspeech 2019, pp. 3203-3207. (Year: 2019).*

Wu, Yu, Hua Mao, and Zhang Yi, "Audio classification using attention-augmented convolutional neural network", Jul. 2018, Knowledge-Based Systems 161, pp. 90-100. (Year: 2018).*

Zhang, Yangfan, Xiao Song, and Jian Zhang, "Speaker diarization for multi-speaker conversations via x-vectors", Dec. 2019, 2019 IEEE International Conference on Signal, Information and Data Processing (ICSIDP), pp. 1-4. (Year: 2019).*

Kim, Myungjong, Vijendra Raj Apsingekar, and Divya Neelagiri, "X-Vectors with Multi-Scale Aggregation for Speaker Diarization", May 2021, arXiv preprint arXiv:2105.07367. (Year: 2021).*

Quan Wang et al., "Speaker Diarization with LSTM", arXiv: 1710.10468v1, Oct. 28, 2017, pp. 1-5.

Anthony Larcher et al., Speaker Embeddings for Diarization of Broadcast Data in the Allies Challenge, 2021 IEEE International Conference on Acoustics, Speech and Signal Processing (ICASSP 2021), Jun. 11, 2021, pp. 5799-5803.

Communication dated Feb. 28, 2023, issued by the International Searching Authority in counterpart International Application No. PCT/KR2022/018957 (PCT/ISA/220, PCT/ISA/210, and PCT/ISA/237).

* cited by examiner

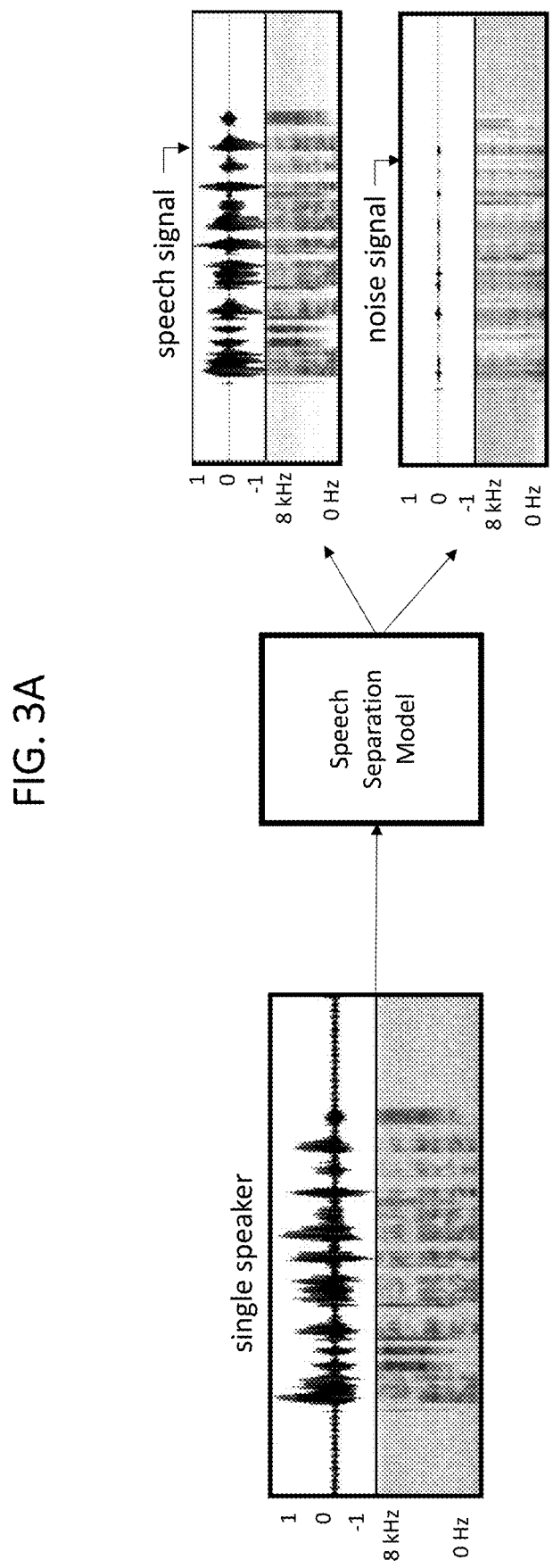

FIG. 5
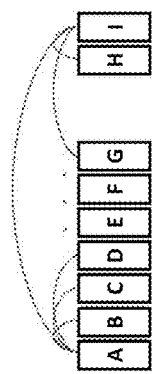
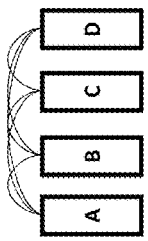

FIG. 22
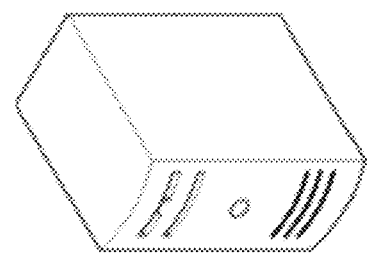
1004
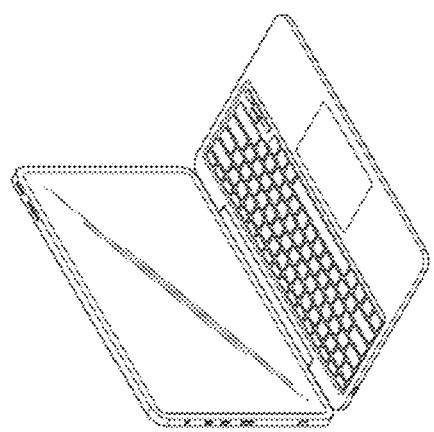
1003
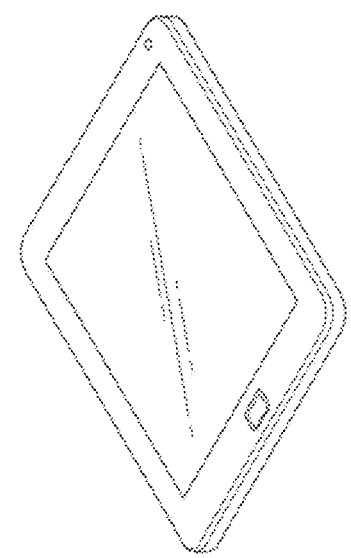
1002
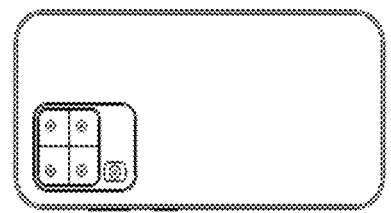
1001

METHOD AND APPARATUS FOR PERFORMING SPEAKER DIARIZATION ON MIXED-BANDWIDTH SPEECH SIGNALS

BACKGROUND

1. Field

The disclosure relates to a method and an apparatus for identifying different speakers in an audio stream, and particularly identifying speakers from mixed-bandwidth speech signals, and analyzing the audio stream according to identifications of the speakers.

2. Description of Related Art

Speaker diarization is the process of labeling different speakers in an audio stream, responding to the question "who spoke when" in a multi-speaker conversation, or determining that only one speaker is present. Speaker diarization has potential in a variety of applications such as meeting conversation analysis and multimedia information retrieval. For meeting conversation analysis for example, speaker diarization may be used as a front-end component of automatic speech recognition (ASR), providing improved ASR accuracy and rich analysis depending on participants.

Different devices and equipment usually capture speech data at different sampling rates. For example, smartphones support wideband sampling rates (e.g., 16 kHz) and phone calls through landline telephone networks or some Bluetooth devices provide narrowband sampling rates (8 kHz). Thus any group call conversation might have a mixed-bandwidth (wideband and narrowband) speech signal or audio recording.

When mixed-bandwidth speech signals, including narrowband speech data and wideband speech data, are received from multiple devices, a signal processor may down-sample the wideband speech data or extend the bandwidth of the narrowband speech data so that the wideband speech data and the narrowband speech data can be combined in a single channel.

In processing mixed-bandwidth speech data, if down-sampling is performed on the wideband speech data to place both the wideband speech data and the narrowband speech data into one bandwidth, high frequency information in the speech signal will be lost and accuracy will decrease compared to original wideband signals.

If up-sampling is performed on the narrowband speech data to place both the wideband speech data and the narrowband speech data into one bandwidth, high frequency signals may not have useful information. Since spectral characteristics of the up-sampled narrowband speech data are different from original wideband speech data, when the same speaker speaks in different bandwidths, a speaker diarization system that up-samples narrowband speech data is likely to decide utterances from the same speaker as being from two different speakers.

Down-sampling wideband signals and up-sampling narrowband signals are examples of ways inaccuracies can be introduced to a speaker diarization system. As another example, if a speaker diarization system regards narrowband speech signals as noise then the system may not extract appropriate speaker embeddings from the narrowband speech signals, and therefore diarization accuracy may be degraded when a wideband signal and a narrowband signal is mixed in an audio stream. Accordingly, there is a need for extracting speaker embeddings and identifying speakers from mixed bandwidth speech signals with a high accuracy rate.

SUMMARY

In accordance with an aspect of the disclosure, there is provided an apparatus for processing speech data, including: a memory storing instructions; and a processor configured to execute the instructions to: separate an input speech into speech signals; identify a bandwidth of each of the speech signals; extract speaker embeddings from the speech signals based on the bandwidth of each of the speech signals, using at least one neural network configured to receive the speech signals and output the speaker embeddings; and cluster the speaker embeddings into one or more speaker clusters, each speaker cluster corresponding to a speaker identity.

The processor may be further configured to execute the instructions to:cluster the speaker embeddings based on a vector dissimilarity between a plurality of pairs of the speaker embeddings until the vector dissimilarity becomes greater than a predetermined threshold or a number of clusters becomes greater than a predetermined number.

The processor may be further configured to execute the instructions to: obtain the speaker embeddings from each of a plurality of different speech embedding extraction models by inputting the speech signals having different bandwidths to the different speech embedding extraction models, wherein the at least one neural network of each of the plurality of different speech embedding extraction models is trained based on the different bandwidths; cluster the speaker embeddings for each of the different bandwidths separately, to obtain bandwidth-dependent embedding clusters for each of the different bandwidths; and combine the bandwidth-dependent embedding clusters based on a vector dissimilarity between the bandwidth-dependent clusters, to obtain cross-bandwidth embedding clusters.

The different bandwidths may include a first bandwidth and a second bandwidth, and the plurality of different speech embedding extraction models may include a first model trained based on the first bandwidth, and a second model trained based on the second bandwidth. The processor may be further configured to execute the instructions to: obtain the speaker embeddings corresponding to the first bandwidth, and the speaker embeddings corresponding to the first bandwidth, from the first model and the second model, respectively; cluster the speaker embeddings corresponding to the first bandwidth, and the speaker embeddings corresponding to the second bandwidth, separately, to obtain first-bandwidth clusters and second-bandwidth clusters, respectively; and combine the first-bandwidth clusters and the second-bandwidth clusters based on the vector dissimilarity between the first-bandwidth clusters and the second-bandwidth clusters, to obtain the cross-bandwidth embedding clusters.

Each of the plurality of different speech embedding extraction models may include: a plurality of frame-level layers configured to process the speech signals at a frame-level, to provide frame-level representations of the speech signals; a pooling layer configured to aggregate the frame-level representations over a segment, based on a deviation of the frame-level representations; a plurality of segmentation-level layers configured to process the frame-level representations at a segmentation level to provide segmentation-level representations of the speech signals and the speaker embeddings; and an output layer configured to output a speaker identification of each of the segmentation-level representations of the speech signals.

The plurality of frame-level layers may form a convolutional neural network or a time-delayed neural network.

The speaker embeddings may be output from a last hidden layer of the plurality of segmentation-level layers that immediately precedes the output layer.

The output layer may use a softmax activation function.

The processor may be further configured to execute the instructions to: extract the speaker embeddings from the speech signals, using the at least one neural network that is further configured to receive bandwidth information corresponding to the speaker embeddings.

The identified bandwidth may include a first bandwidth and a second bandwidth. The processor may be further configured to execute the instructions to: while extracting the speaker embeddings from the speech signals, input information of the first bandwidth to the at least one neural network when the speech signals of the first bandwidth are input to the at least one neural network, and input information of the second bandwidth to the at least one neural network when the speech signals of the second bandwidth are input to the at least one neural network.

The at least one neural network may include: a plurality of frame-level layers configured to process the speech signals at a frame-level, to provide frame-level representations of the speech signals; a pooling layer configured to aggregate the frame-level representations over a segment, based on a deviation of the frame-level representations; a plurality of segmentation-level layers configured to process the frame-level representations at a segmentation level to provide segmentation-level representations of the speech signals and the speaker embeddings; and an output layer configured to output an speaker identification of each of the segmentation-level representations of the speech signals, wherein the bandwidth information may be input to one of the plurality of frame-level layers, and to the plurality of segment-level layers.

According to another aspect of the disclosure, an apparatus for processing speech data, may include: a memory storing instructions; and a processor configured to execute the instructions to: separate an input speech into speech signals; extract speaker embeddings from the speech signals, using at least one neural network configured to receive the speech signals and output the speaker embeddings, based on attention heads that enable the at least one neural network to attend to a same bandwidth portion and a same speaker portion of the speech signals; and cluster the speaker embeddings into one or more speaker clusters, each speaker cluster corresponding to a speaker identity.

The processor may be further configured to execute the instructions to: cluster the speaker embeddings based on a vector dissimilarity between a plurality of pairs of the speaker embeddings until the vector dissimilarity becomes greater than a predetermined threshold or a number of clusters becomes a predetermined number.

The processor may be further configured to execute the instructions to: identify at least one non-speech cluster from the plurality of speaker clusters based on comparison between a representative speaker vector of each of the plurality of speaker clusters and a pre-registered speaker vector, and filter out the at least one non-speech cluster from the plurality of speaker clusters.

According to another aspect of the disclosure, a method for processing speech data may include: separating an input speech into speech signals; identifying a bandwidth of each of the speech signals; extracting speaker embeddings from the speech signals based on the bandwidth of each of the speech signals, using at least one neural network configured to receive the speech signals and output the speaker embeddings; and clustering the speaker embeddings into one or more speaker clusters, each speaker cluster corresponding to a speaker identity.

The identifying the speaker may include: identifying the speaker of each of the plurality of speaker clusters based on a vector dissimilarity between a plurality of pairs of the speaker embeddings until the vector dissimilarity becomes greater than a predetermined threshold or a number of clusters becomes a predetermined number.

The extracting the speaker embeddings may include: obtaining the speaker embeddings from each of a plurality of different speech embedding extraction models by inputting the speech signals having different bandwidths to the different speech embedding extraction models, wherein the at least one neural network of each of the plurality of different speech embedding extraction models is trained based on the different bandwidths; clustering the speaker embeddings for each of the different bandwidths separately, to obtain bandwidth-dependent embedding clusters for each of the different bandwidths; and combining the bandwidth-dependent embedding clusters based on a vector dissimilarity between a plurality of pairs of the bandwidth-dependent clusters, to obtain cross-bandwidth embedding clusters.

The different bandwidths may include a first bandwidth and a second bandwidth, and the plurality of different speech embedding extraction models may include a first model trained based on the first bandwidth, and a second model trained based on the second bandwidth. The extracting the speaker embeddings may further include: obtaining the speaker embeddings corresponding to the first bandwidth, and the speaker embeddings corresponding to the first bandwidth, from the first model and the second model, respectively; clustering the speaker embeddings corresponding to the first bandwidth, and the speaker embeddings corresponding to the second bandwidth, separately, to obtain first-bandwidth clusters and second-bandwidth clusters, respectively; and combining the first-bandwidth clusters and the second-bandwidth clusters based on the vector dissimilarity between a plurality of pairs of the first-bandwidth clusters and the second-bandwidth clusters, to obtain the cross-bandwidth embedding clusters.

The extracting the speaker embeddings may include: inputting bandwidth information corresponding to the speaker embeddings to the at least one neural network to obtain, as output, the speaker embeddings extracted from the speech signals.

The at least one neural network may include a plurality of frame-level layers, a pooling layer, a plurality of segmentation-level layers, and an output layer. The inputting the bandwidth information to the at least one neural network may include: inputting the bandwidth information to one of the plurality of frame-level layers, and to the plurality of segmentation-level layers.

The identified bandwidth may include a first bandwidth and a second bandwidth. The extracting the speaker embeddings may include: while extracting the speaker embeddings from the speech signals, inputting information of the first bandwidth to the at least one neural network when the speech signals of the first bandwidth are input to the at least one neural network, and inputting information of the second bandwidth to the at least one neural network when the speech signals of the second bandwidth are input to the at least one neural network.

According to another aspect of the disclosure, a method for processing speech data may include: separating an input speech into speech signals; extracting speaker embeddings from the speech signals, using at least one neural network configured to receive the speech signals and output the speaker embeddings, based on attention heads that enable the at least one neural network to attend to a same bandwidth portion and a same speaker portion of the speech signals; and clustering the speaker embeddings into one or more speaker clusters, each speaker cluster corresponding to a speaker identity.

The clustering may include: clustering the speaker embeddings based on a vector dissimilarity between a plurality of pairs of the speaker embeddings until the vector dissimilarity becomes greater than a predetermined threshold or a number of clusters becomes a predetermined number.

The method may further include: identifying at least one non-speech cluster from the plurality of speaker clusters based on comparison between a representative speaker vector of each of the plurality of speaker clusters and a pre-registered speaker vector; and filtering out the at least one non-speech cluster from the plurality of speaker clusters.

BRIEF DESCRIPTION OF THE DRAWINGS

The above and other aspects, features, and advantages of embodiments of the disclosure will be more apparent from the following description taken in conjunction with the accompanying drawings, in which:

FIGS. 3A and 3B illustrate examples of speech separation according to embodiments;

FIG. 5 is a diagram illustrating a speaker embedding clustering process according to embodiments;

FIG. 22 illustrates examples of an electronic apparatus performing speaker diarization according to various embodiments of the disclosure.

DETAILED DESCRIPTION

Embodiments described herein provide a method and an apparatus for identifying different speakers in an audio stream, and particularly identifying speakers from mixed-bandwidth speech signals, and analyzing the audio stream according to identifications of the speakers.

The methods disclosed herein accurately identify one or more speakers from mixed bandwidth speech signals. For example, clustering speaker embeddings according to methods disclosed herein may use one or more neural network models that are trained using mixed bandwidth signals, rather than being trained on only wide bandwidth signals. Therefore, when an input audio signal has a narrow bandwidth (e.g., a frequency range below 4 kHz) but is upsampled to have a wide bandwidth format, the neural network model according to embodiments of the disclosure may improve the speaker representation accuracy on the narrowband signal. Also, the clustering methods disclosed herein may improve the accuracy of speaker representation even when the input audio signal has mixed bandwidths.

Example embodiments are described in greater detail below with reference to the accompanying drawings.

In the present disclosure, the term "narrowband" or "narrow bandwidth" may refer to a frequency bandwidth 300-3400 Hz, and the term "wideband" or "wider bandwidth" may refer to a frequency bandwidth 50 Hz to 7 kHz. However, the frequency bandwidth of the narrowband and the wideband may not be limited to the ranges indicated above, and the "narrowband" may be understood as a relatively narrow frequency range that is narrower than the "wideband."

Figure 1:
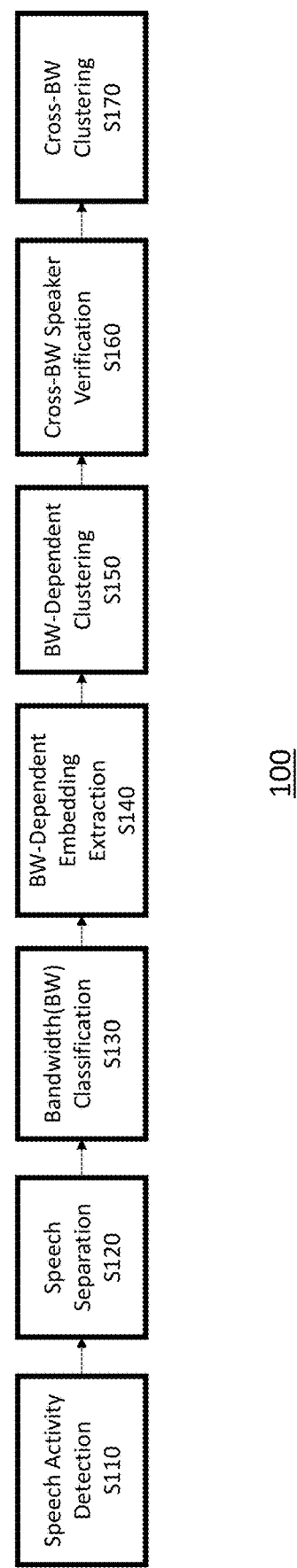
FIG. 1 is a diagram illustrating a method of performing speaker diarization on mixed-bandwidth speech signals according to embodiments of the present disclosure.

FIG. 1 is a diagram illustrating a method 100 of performing speaker diarization based on bandwidth classification according to embodiments of the present disclosure. Operations S110-S170 illustrated in FIG. 1 may be performed by at least one processor included in any type of electronic device, for example, a smartphone, a laptop computer, a personal computer (PC), a smart television, a server, and the like.

As shown in FIG. 1, the method 100 includes operation S110 of detecting speech activities from an audio stream, operation S120 of separating overlapped speech signals from the audio stream, operation S130 of identifying a bandwidth corresponding to each of the speech signals, operation S140 of extracting speaker embeddings from the speech signals based on a bandwidth classification of each of the speech signals, operation S150 of clustering the speaker embeddings per bandwidth, as bandwidth-dependent speaker clusters, operation S160 of performing a cross-bandwidth speaker verification on the bandwidth-dependent speaker clusters to determine if there is the same speaker in the bandwidth-dependent speaker clusters of different bandwidths, and operation S170 of combining the bandwidth-dependent speaker clusters based on a result of the cross-bandwidth speaker verification, to obtain cross-bandwidth speaker clusters that correspond to multiple speakers in the auto stream, respectively. Final speaker identifications (IDs) may be assigned to the cross-bandwidth speaker clusters, and the number of the final speaker IDs may match the number of speakers in the audio stream.

The speaker identities determined by the speaker clusters may be used to identify the speaker of a speech segment corresponding to the speech signal, for example to present the identity of a speaker to a user accessing the speech segment. This identification may be in real-time or stored in memory and presented on demand when the speech segment is accessed. The speaker identifications may be indicated in any suitable manner, such as graphical indication of a speaker of an audio speech segment or an annotation of a transcript corresponding to the speech segment.

In an embodiment, operation S120 may be performed if an overlapped speech detection (OSD) module determines that a speech segment includes overlapped speech from multiple speakers, but operation S120 may be omitted if the OSD module determines that the speech segment includes speech from a single speaker.

Specifically, in operation S110, the method S100 includes performing speech activity detection (SAD) to automatically identify speech signal (each of which includes speech segments) from an input audio signal, for example, based on a Gaussian mixture model, a hidden Markov model, or a multi-layer perceptron model. The SAD is applied to the input audio signal to filter out non-speech frames and to divide the detected speech signals into short-time windowed speech segments (e.g., 1.5 second segments).

In an embodiment, a Long Short Term Memory (LSTM)-Recurrent Neural Network (RNN) based speech activity detection model may be applied to detect speech signals from the input audio signal. The LSTM-RNN based speech activity detection model may include at least three layers. Among the at least three layers of the LSTM-RNN based speech activity detection model, an input layer receives frame-level acoustic features (e.g., Mel-filter bank energies, Mel-frequency cepstral coefficients), and an output layer outputs binary data, which indicates whether the input audio signal (or a speech segment in the input audio signal) is speech or non-speech. In another example, the output layer of the LSTM-RNN based speech activity detection model may output probabilities for speech and non-speech classes, and a higher probability among the output probabilities is selected to determine whether the input audio signal (or a speech segment in the input audio signal) is speech or non-speech. The LSTM-RNN based speech activity detection model may be trained using wideband and narrowband speech data together as a speech group, and other non-speech data, such as music, animal sound, and ambient noise, as a non-speech group.

In operation S120, the method S100 includes applying speech separation to the speech segments of the speech signals, to separate the speech signals if the speech signals are overlapped with each other in a time domain. Operation S120 will be further described later with reference to FIGS. 2, 3A and 3B.

In operation S130, a bandwidth of each of the speech segments is identified, for example, using a neural network-based bandwidth classification model.

In an embodiment, signal-based bandwidth classification may be performed to determine a bandwidth of a speech signal. For example, when a ratio of a higher band frequency energy (e.g., 4-8 kHz) to a narrow band frequency energy (0-4 kHz) of a speech signal is less than a threshold, then the speech signal is determined as a narrowband speech. Otherwise, the speech signal is determined as a wideband speech. The threshold may be set to 0.2.

In another example, model-based bandwidth classification may be performed to determine a bandwidth of a speech signal using a neural network that is trained to classify speech signals to wideband speech signals and narrowband speech signals.

In operation S140, speaker embeddings are extracted from the speech segments using speaker embedding extraction models that correspond to different bandwidths of the speech segments. For example, when a speech segment is identified as a wideband speech, the speech segment is input to a wideband speaker embedding extraction model, and when the speech segment is identified as a narrowband speech, the speech segment is input to a narrowband speaker embedding extraction model. The bandwidth-dependent speaker embedding extraction models may include one or more neural networks. The structure and the operation of the bandwidth-dependent speaker embedding extraction models will be described later with reference to FIG. 4.

In operation S150, the speaker embeddings are clustered per bandwidth, to determine speech segments that belong to the same speaker identities per bandwidth and thereby to obtain bandwidth-dependent speaker clusters. For example, the speaker embeddings corresponding to the wideband bandwidth are clustered separately from the speaker embeddings corresponding to the narrow bandwidth.

In one embodiment, a vector similarity (or a vector dissimilarity) is determined between each pair of speaker embeddings, which may be represented in a score matrix. A hierarchical clustering algorithm may be applied to the score matrix to collapse pairs of speaker embeddings into clusters by combining pairs of speaker embeddings and/or clusters that have the highest vector similarity (or the lowest vector dissimilarity) between each other. This algorithm is performed iteratively until no speaker embeddings or clusters of speaker embeddings have a sufficiently high similarity (or a sufficiently low dissimilarity) to justify further collapsing them into larger clusters, or until the number of clusters reaches a preset number. The result is one or more clusters of speaker embeddings, where speaker embeddings in each cluster have higher similarities (or lower dissimilarities) with each other than with vector similarities (or vector dissimilarities) between speaker embeddings that are not in the cluster. A clustering process will be further described later with reference to FIG. 6.

In operation S160, speaker verification is performed between bandwidth-dependent speaker clusters to determine if there are speeches spoken by the same speaker in the bandwidth-dependent speaker clusters of different bandwidths.

For example, when there are five bandwidth-dependent speaker clusters, including narrowband-based speaker clusters, N1 and N2, and wideband-based speaker clusters, W1, W2, and W3, a vector similarity (e.g., a cosine similarity) or a vector dissimilarity (e.g., a cosine dissimilarity) between a plurality of pairs of narrowband-based speaker clusters, N1 and N2, and wideband-based speaker clusters, W1, W2, and W3, may be computed, as follows:

A first vector dissimilarity between the speaker embedding of narrowband-based speaker cluster N1 and the speaker embedding wideband-based speaker cluster A second vector dissimilarity between the speaker embedding of narrowband-based speaker cluster N1 and the speaker embedding of wideband-based speaker cluster W2;

A third vector dissimilarity between the speaker embedding of narrowband-based speaker cluster N1 and the speaker embedding of wideband-based speaker cluster W3;

A fourth vector dissimilarity between the speaker embedding of narrowband-based speaker cluster N2 and the speaker embedding of wideband-based speaker cluster W1;

A fifth vector dissimilarity between the speaker embedding of narrowband-based speaker cluster N2 and the speaker embedding of wideband-based speaker cluster W2; and A sixth vector dissimilarity between the speaker embedding of narrowband-based speaker cluster N2 and speaker embedding of wideband-based speaker cluster W3.

In computing the first to the sixth vector dissimilarities, the speaker embedding of each of the bandwidth-dependent speaker clusters may be obtained by averaging vector values of the speaker embeddings belonging to the same bandwidth-based speaker clusters. In an embodiment of the disclosure, two speaker embeddings may be input to a neural network that is trained to output a dissimilarity score between the two speaker embeddings, and thereby to determine whether the two speaker embeddings are from the same speaker or not.

Once the vector dissimilarities are obtained as dissimilarity scores, the dissimilarity scores are compared with a predetermined dissimilarity threshold, and two clusters having a dissimilarity score that is less than the predetermined threshold are combined as the same cluster, when the number of speakers in the audio stream is unknown. When the number of speakers in the audio stream is known, a clustering algorithm is applied to identify a pair of speaker embeddings having a dissimilarity score that is less than the predetermined dissimilarity threshold, combine them as the same cluster, and then increase the predetermined dissimilarity threshold to iteratively perform the clustering algorithm until the total number of clusters becomes the number of speakers. For example, when the third vector dissimilarity between the speaker embedding of narrowband-based speaker cluster N1 and the speaker embedding of wideband-based speaker cluster W3 is less than the predetermined dissimilarity threshold, narrowband-based speaker cluster N1 and the speaker embedding of wideband-based speaker cluster W3 are clustered as the same cluster. When the number of speakers in the audio stream is known, the clustering is iteratively performed by iteratively increasing the predetermined dissimilarity threshold until the number of clusters becomes equal to the number of speakers. For example, when it is known that there are four (4) speakers in the audio stream, the clustering stops when narrowband-based speaker cluster N1 and wideband-based speaker cluster W3 are clustered into the same cluster, and therefore the total number of clusters becomes four (4). Every time when two clusters are combined as the same cluster but the total number of clusters is greater than the number of speakers, the predetermined dissimilarity threshold is increased and operation S160 is iteratively performed based on the increased dissimilarity threshold.

In an embodiment of the disclosure, when the number of speakers is not known, the bandwidth-dependent clustering of operation S150 includes comparing a dissimilarity score of (any) two clusters with a first threshold, and combining the two clusters having a dissimilarity score that is less than the first threshold, as the same cluster, and the cross-bandwidth speaker verification of operation 160 includes comparing a dissimilarity score of (any) two different bandwidth clusters with a second threshold, and combining the two different bandwidth clusters having a dissimilarity score that is less than the second threshold, as the same cluster. The second threshold may be the same as or different from the first threshold.

On the other hand, when the number of speakers is known, clustering is performed based on information of the number of speakers as well as an adaptively adjusted threshold in an iterative way. When the number of speakers is known, the bandwidth-dependent clustering of operation S150 is iteratively performed until the number of clusters become the number of speakers or the lowest dissimilarity score reaches a first threshold, the cross-bandwidth speaker verification of operation 160 includes comparing a dissimilarity score of (any) two different bandwidth clusters with a second threshold, and combining the two different bandwidth clusters having a dissimilarity score that is less than the second threshold, as the same cluster, until the total number of clusters becomes equal to the number of speaker. After each clustering step in operation 160, the second threshold is increased (by a preset value) and operation S160 is iteratively performed based on the increased second threshold until the total number of clusters reaches the number of speakers. In other words, the second threshold is iteratively increased until the total number of clusters becomes equal to the number of speakers. The second threshold may be the same as or different from the first threshold.

In operation 170, the bandwidth-dependent speaker clusters are merged based on final speaker identifications assigned to each of the bandwidth-dependent speaker clusters. For example, when the clustering stops after narrowband-based speaker cluster N1 and wideband-based speaker cluster W3 are clustered into the same cluster, final speaker identification nos. 1-4 are assigned to cluster {W1}, cluster {W2}, cluster {N1, W3}, and cluster {N2}, respectively.

Figure 2:
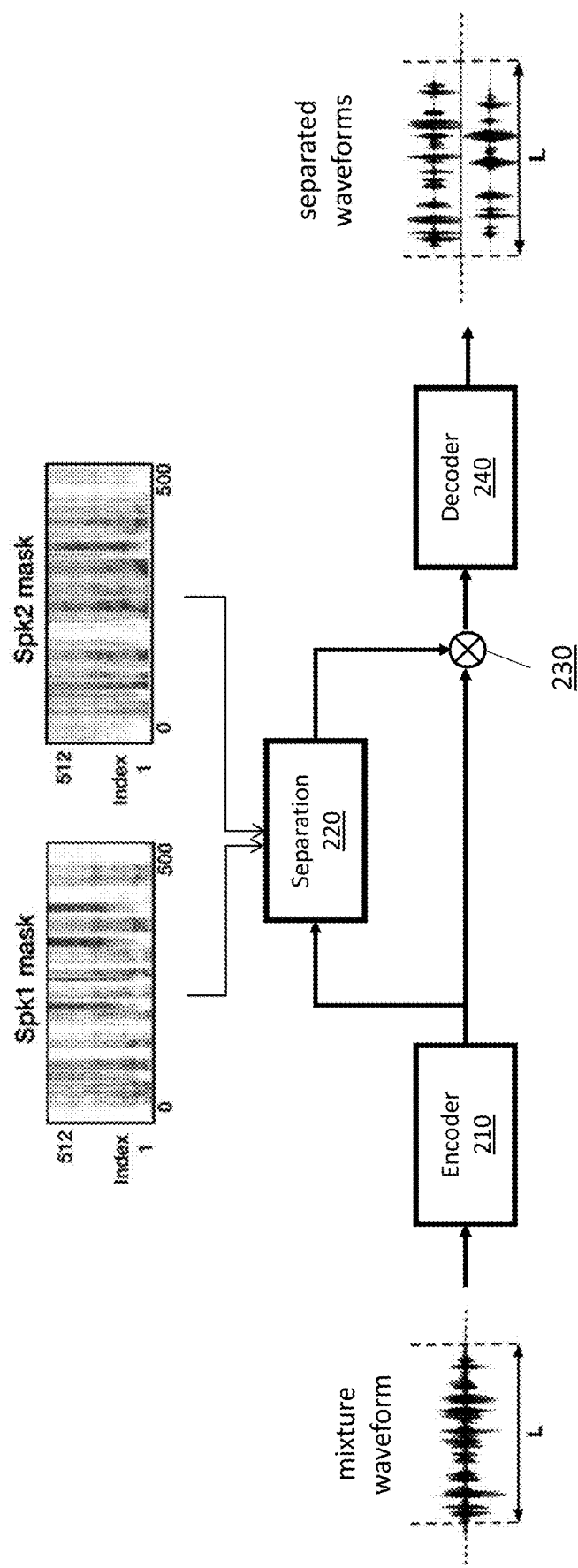
FIG. 2 is a diagram illustrating a speech separation process according to embodiments.

FIG. 2 is a diagram illustrating a method of performing speech separation according to an embodiment.

In an embodiment of the disclosure, a deep learning-based speech separation model may be used to separate overlapped speech signals.

As shown in FIG. 2, the deep learning-based speech separation model may include an encoder 210, a separation module 220, a multiplier 230, and a decoder 240.

The encoder 210 may receive a speech segment of a length L, in which two speech signals Spk1 and Spk2 are overlapped.

The encoder 210 may map the speech segment to a high-dimensional representation via a convolutional operation. For example, the encoder 210 may include a 1×1 convolutional layer, followed by a nonlinear activation function layer, a normalization layer, and a depth-wise convolutional layer, to output the high-dimensional representation of the speech segment.

The separation module 220 may compute a multiplicative function (i.e., a mask) for each target source (e.g., each of the two speech signals Spk1 and Spk2), based on an output from the encoder 210. For example, the separation module 220 may use a temporal convolutional network (TCN) or a fully convolutional neural network including stacked 1-D convolutional layers, to estimate a mask (e.g., Spk1 mask and Spk 2 mask) for each of the speech signals Spk1 and Spk2.

The multiplier 230 may multiply the output of the encoder 210 by the Spk1 mask and the Spk 2 mask, in sequence or in parallel, to obtain a first masked feature and a second masked feature, respectively.

The decoder 240 may reconstruct speech signals Spk1 and Spk2 from the first masked feature and the second masked feature, for example, using a one-dimensional (1-D) transposed convolution operation. As a result, speech signals Spk1 and Spk2 are separated from the speech segment.

The separation process in FIG. 2 shows that two speech signals are separated from a mixture waveform, but the number of separable speech signals is not limited thereto, and more than two speech signals may be separated out via the speech separation process according to the embodiment of the present application.

Figure 3B:
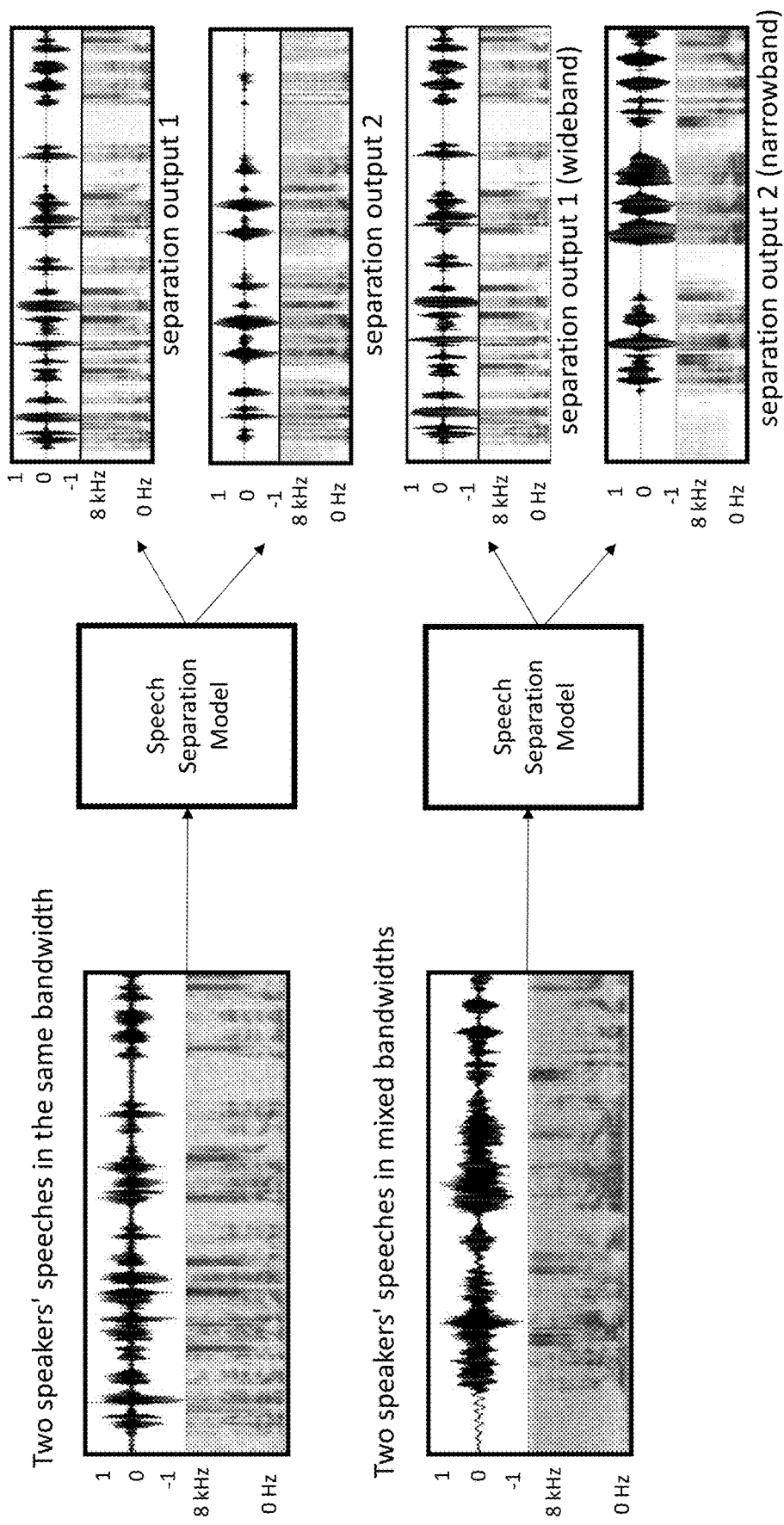

FIGS. 3A and 3B illustrate examples of speech separation according to an embodiment.

As shown in FIG. 3A, when a single speaker is presented in a speech segment, a speech separation model according to an embodiment may separate two signals from the speech segment, which have different energy levels. An average energy level of each of the two signals may be measured and compared with each other to identify a speech signal and a noise signal, between the two signals.

In an embodiment, an energy-based function may be applied to a first output signal and a second output signal of the speech separation model, to filter out a noise signal. For example, the first output signal is identified as a noise signal and is filtered out when the following first condition is satisfied, and the second output signal is identified as a noise signal and is filtered out when the following second condition is satisfied:

first condition: an average energy of the first output signal <$\lambda$×an average energy of second output signal;
second condition: an average energy of the second output signal <$\lambda$×an average energy of first output signal,
where $\lambda$ is a pre-set weight (e.g. 0.2).

In the embodiment, the noise signal is filtered out, and only the speech signal may be used for further signal processing.

As shown in FIG. 3B, a speech separation model according to an embodiment of the present disclosure is capable of separating two overlapped speech signals of different bandwidths as well as separating two overlapped speech signals of the same bandwidth.

For example, when speech signals from two different speakers are in the same bandwidth, the overlapped speech is separated into a first speech signal corresponding to a first speaker, and a second speech signal corresponding to a second speaker. When the speech signals from the two different speakers are in different bandwidths, the overlapped speech is separated into a first speech signal of a wideband corresponding to a first speaker, and a second speech signal of a narrowband corresponding to a second speaker. As shown in FIG. 3B, high frequency components (e.g., 4-8 kHz) in the second speech signal of the narrowband do not have significant energies, in contrast with high frequency components in the second speech signal of the wideband. In an embodiment, if an average energy level of high frequency components of a speech signal is greater than an energy level threshold, the speech signal is determined as a wideband speech signal, and if not, is determined as a narrowband speech signal.

The speech separation model shown in FIGS. 3A and 3B may be implemented by the encoder 210, the separation model 220, the multiplier 230, and the decoder 240 in FIG. 2.

Figure 4:
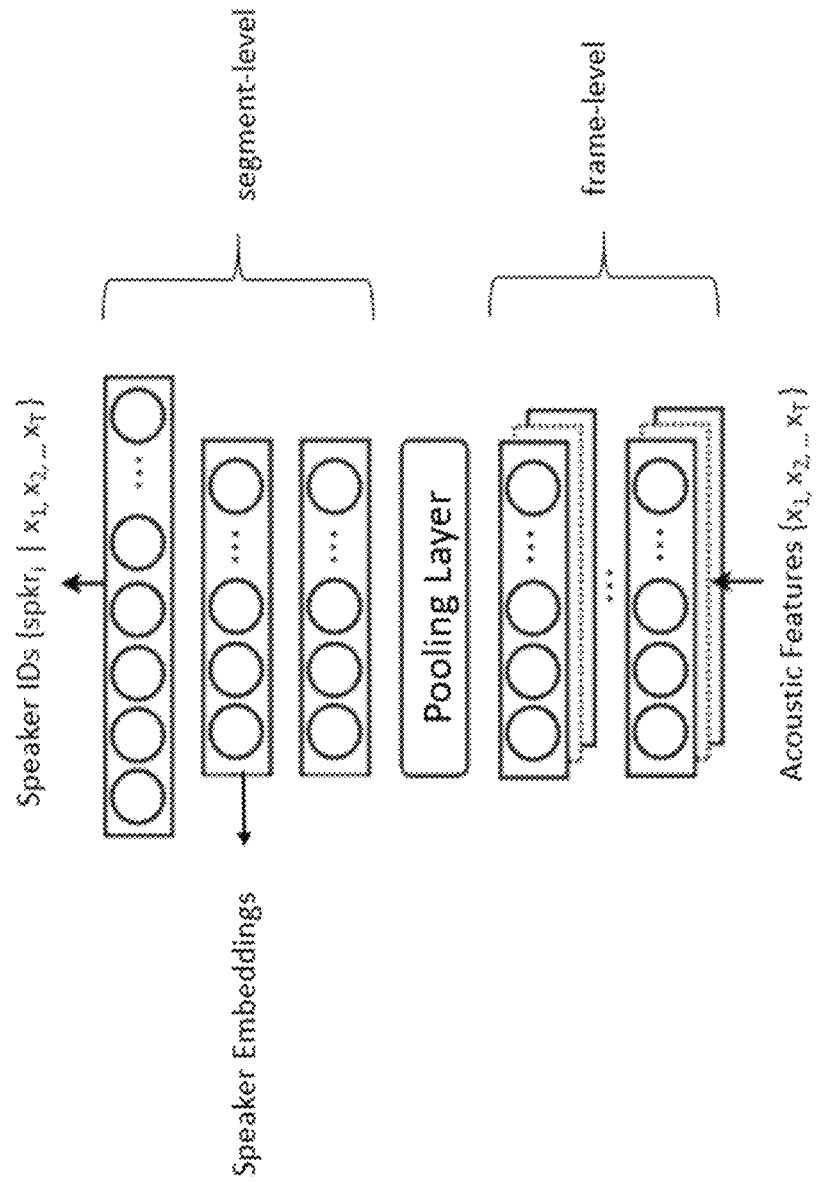
FIG. 4 is a diagram illustrating a speaker embedding extraction process according to embodiments.

FIG. 4 is a diagram illustrating a method of performing a speaker embedding extraction according to embodiments.

In an embodiment of the disclosure, a deep learning based speaker embedding extraction model may be employed to extract speaker embeddings from speech signals.

As shown in FIG. 4, a speaker embedding extraction model includes one or more neural networks. For example, the speaker embedding extraction model may include frame-level layers, a statistics pooling layer, and segment-level layers.

The frame-level feature layers receive, as input, frame-level acoustic features (e.g., features extracted from 10 ms time windowed frames), for example such as Mel-filter bank energies, Mel-frequency cepstral coefficients, and the like. The input is represented as $x_1, x_2, \ldots x_T$, wherein T is the number of frames. For example, when the length of the input speech signal is 1.5 seconds, the speech signal is split into 150 frames, each having the length of 10 ms. The acoustic features extracted from 150 frames, $x_1, x_2, \ldots, x_{150}$, may be input to an input layer of the frame-level feature layers, as the frame-level acoustic features.

The frame-level feature layers may be constituted with a deep neural network such as a convolutional neural network or time-delayed neural network, and may output frame-level activations, $f_1, f_2, \ldots f_n$.

The statistics pooling layer may aggregate the frame-level activations $f_1, f_2, \ldots, f_n$ over a segment (e.g., 1.5 seconds). For example, the statistics pooling layer may compute a mean and standard deviation of the frame-level activations $f_1, f_2, \ldots f_n$ to reduce the frame-level activations $f_1, f_2, \ldots f_n$ to a segment vector.

The segment-level layers may include a plurality of hidden layers followed by a softmax output layer. The plurality of hidden layers may be fully connected layers. A speaker embedding (e.g., a speaker embedding vector) may be output from the last hidden layer, among the plurality of layers, and a speaker identification may be output from the softmax output layer.

The speaker embedding extraction model according to an embodiment may be trained using speech signals of a plurality of different bandwidths, to generate bandwidth-dependent speaker embedding extraction models. For example, the speaker embedding extraction model may be trained using speech signals of a first bandwidth (e.g., a wideband) to generate a first bandwidth-based speaker embedding extraction model (e.g., a wideband-based speaker embedding extraction model), and the speaker embedding extraction model may be trained using speech signals of a second bandwidth to generate a second bandwidth-based speaker embedding extraction model (e.g., a narrowband-based speaker embedding extraction model). The first bandwidth-based speaker embedding extraction model may be used to extract speaker embeddings from speech signals of the first bandwidth. The second bandwidth-based speaker embedding extraction model may be used to extract speaker embeddings from speech signals of the second bandwidth.

FIG. 5 is a diagram illustrating a speaker clustering process according to embodiments.

In an embodiment of the present disclosure, agglomerative hierarchical clustering (AHC) may be applied to cluster speaker embeddings, but the embodiment is not limited thereto. For example, another clustering method, such as a spectral clustering method, may be applied to cluster speaker embeddings.

Firstly, similarity scores or dissimilarity scores may be computed between all pairs of speaker embeddings. For example, as shown in (a) of FIG. 5, dissimilarity scores may be computed between all the pairs of speaker embeddings A, B, C, . . . , I, and a score matrix may be obtained based on the dissimilarity scores. Cosine similarity or probabilistic linear discriminant analysis (PLDA) may be used to compute the dissimilarity scores. When dissimilarity scores are used, the lower the score is, the more similar the pair of speaker embeddings is.

Once the dissimilarity scores are obtained for all the pairs of speaker embeddings, the speaker embeddings are iteratively clustered based on pairwise scores, for example, via a bottom-up clustering method such as an agglomerative hierarchical clustering (AHC) method.

For convenience of explanation, it is assumed that there are four speaker embeddings, A, B, C, and D, in (b1)-(b5) of FIG. 5.

At step 1, dissimilarity scores are computed for all the pairs of speaker embeddings, a pair of A and B, a pair of A and C, a pair of A and D, a pair of B and C, a pair of B and D, and a pair of C and D. The dissimilarity scores may be presented in the form of a score matrix.

At step 2, the pair of speaker embeddings having the lowest dissimilarity score is identified from the score matrix. Referring to (b2) of FIG. 5, the pair of A and B is identified as having the lowest dissimilarity score of 0.2.

At step 3, the pair of speaker embeddings having the lowest dissimilarity score is grouped as the same cluster, and the dissimilarity scores are updated with lower scores of pairs. As shown in (b2) and (b3) of FIG. 5, the pair of speaker embeddings A and B having the lowest dissimilarity score of 0.2 is collapsed into cluster AB. In updating the dissimilarity scores between a pair of AB and C and a pair of AB and D, the dissimilarity score 0.6 between B and C, and the dissimilarity score 0.5 between B and D are selected, among the dissimilarity score 0.7 between A and C, the dissimilarity score 0.8 between A and D, the dissimilarity score 0.6 between C and D, and the dissimilarity score 0.5 between B and D, based on the determination that the dissimilarity score 0.6 between B and C is lower than the dissimilarity score 0.7 between A and C, and the dissimilarity score 0.5 between B and D is lower than the dissimilarity score 0.8 between A and D.

At step 4, the pair of speaker embeddings having the lowest dissimilarity score is identified from the updated score matrix. Referring to (b3) of FIG. 5, the pair of C and D is identified as having the lowest dissimilarity score of 0.3, and C and D are collated into cluster CD.

At step 5, the score matrix is updated as shown in (b4) of FIG. 5, to provide the dissimilarity score between the pair of AB and CD.

The clustering is terminated when the number of clusters reaches a predetermined number of clusters N. The predetermined number of clusters N may represent a number of speakers in an input audio stream or an audio recording. For example, when N is 2, the clustering stops when A and B are collapsed into cluster AB and C and D are collapsed into cluster CD, and as a result, the number of clusters becomes two (2).

In an embodiment, when N is unknown, the clustering is continued until the lowest dissimilarity score among a plurality of dissimilarity scores becomes higher than a dissimilarity threshold TH. For example, at step b5, when N is unknown, the dissimilarity score (e.g., 0.5) between cluster AB and cluster CD is compared with the dissimilarity threshold TH (e.g., 0.4), and the clustering stops if the dissimilarity score is greater than the dissimilarity threshold TH, as shown in (b5) of FIG. 6. As a result, two clusters AB and CD are obtained as corresponding to two different speakers.

Figure 6:
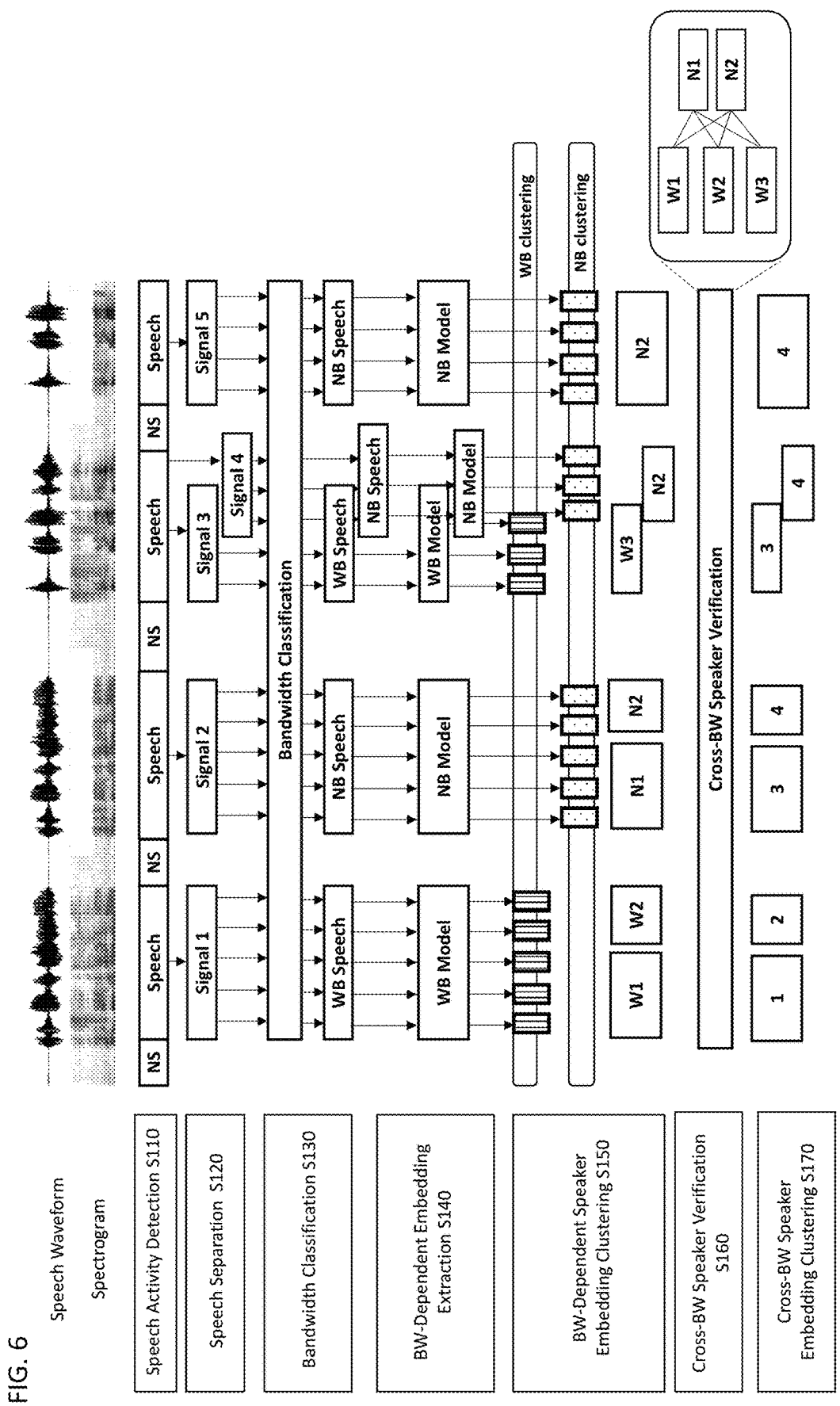
FIG. 6 illustrates an overall speaker diarization process according to embodiments.

FIG. 6 illustrates an overall speaker diarization process according to embodiments.

As shown in FIG. 6, in operation S110, speech activity detection (SAD) is performed on a speech waveform to identify speech segments and non-speech (NS) segments from the speech waveform.

In operation S120, speech separation is performed on the speech segments to separate speech signals in a case in which there is overlapped speech in the speech segments. For example, referring to FIG. 7, there is overlapped speech in the third speech activity detection among the four speech activity detections, and two speech signals (i.e., speech signals 3 and 4) are separated from the third speech activity detection. As a result, five speech signals (i.e., speech signals 1-5) are obtained from the four speech activity detections in the example of FIG. 6.

In operation S130, a bandwidth of each of the speech signals is identified using a signal-based bandwidth classification method or a model-based bandwidth classification method.

In the signal-based bandwidth classification method, a ratio of a higher band frequency energy (e.g., 4-8 kHz) to a narrow band frequency energy (0-4 kHz) of each speech signal 1-5 is calculated and compared with a threshold. If the ratio is less than the threshold, the speech signal is determined as a narrowband speech. Otherwise, the speech signal is determined as a wideband speech.

In the model-based bandwidth classification method, each speech signal 1-5 is input to a neural network model to obtain, as output, a bandwidth classification of each speech signal 1-5.

In operation S140, wideband speech signals 1 and 3 are input to a wideband speaker embedding extraction model, and narrowband speech signals 2, 4, and 5 are input to a narrowband speaker embedding extraction model. The wideband speaker embedding extraction model includes one or more neural networks that are trained using sample wideband speech signals, and the narrowband speaker embedding extraction model includes one or more neural networks that are trained using sample narrowband speech signals. In an embodiment of the disclosure, the wideband speaker embedding extraction model and the narrowband speaker embedding extraction model may have the same neural network structure, for example, as shown in FIG. 4, but may be trained using different training data so that the wideband speaker embedding extraction model is tailored to extract speaker embeddings from wideband speech signals, and the narrowband speaker embedding extraction model is tailored to extract speaker embeddings from narrowband speech signals.

Referring back to FIG. 6, wideband speech signals 1 and 3 are input to the wideband speaker embedding extraction model, and speaker embeddings W are extracted from wideband speech signals 1 and 3 via the wideband speaker embedding extraction model. Narrowband speech signals 2, 4, and 5 are input to the narrowband speaker embedding extraction model, and speaker embeddings N are extracted from narrowband speech signals 2, 4, and 5 via the narrowband speaker embedding extraction model. Each speech signal 1-5 includes a plurality of speech segments (e.g., 1.5 second speech segments), and the speaker embedding extraction models may extract speaker embeddings W and N from each of the plurality of speech segments. For example, speech signal 1 includes five segments, and five speaker embeddings W are extracted from the five speech segments of speech signal 1, using the wideband speaker embedding extraction model.

A conventional embedding extraction model may be used to process speech recordings regardless of the bandwidth of the speech recordings. When speech signals from the same speaker have mixed bandwidths, performance of the conventional embedding extraction model may be degraded because the conventional embedding extraction model may recognize different bandwidth speeches as being originated from different speakers even in a case in which the different bandwidth speeches are spoken by the same speaker. In contrast, bandwidth-dependent speaker embedding extraction models according to an embodiment are separately and individually trained using different bandwidth signals. Therefore, speaker embeddings are more effectively extracted by processing the different bandwidth signals via different speaker embedding extraction models corresponding to the different bandwidth signals.

In operation S150, bandwidth-dependent clustering is performed on speaker embeddings W and speaker embeddings N separately. Specifically, speaker embeddings W extracted by the wideband speaker embedding extraction model are clustered based on vector dissimilarities between a plurality of pairs of speaker embeddings W, to determine speech segments that belong to the same speaker identity. In a separate process, the speaker embeddings N extracted by the narrowband speaker embedding extraction model B clustered based on vector dissimilarities between a plurality of pairs of speaker embeddings N, to determine speech segments that belong to the same speaker identity. An agglomerative hierarchical clustering (AHC) method may be used to cluster the speaker embeddings W and the speaker embeddings B in a manner as described in FIG. 5.

Referring to FIG. 6, the speaker embeddings W output from the wideband speaker embedding extraction model are grouped into three speaker clusters W1, W2, and W3 that belong to three different (intermediate) speaker identities. The speaker embeddings N output from the narrowband speaker embedding extraction model are grouped into three speaker clusters N1 and N2 that belong to two different (intermediate) speaker identities.

In operation S160, speaker verification is performed across bandwidth-dependent speaker clusters to determine if there are speeches spoken by the same speaker in the different bandwidth speaker clusters.

For example, when there are five bandwidth-dependent speaker clusters, including wideband bandwidth-based speaker clusters, W1-W3, and narrowband-based speaker clusters, N1 and N2, vector dissimilarities between each of the wideband-based speaker clusters, W1-W3, and each of the narrowband-based speaker clusters, N1 and N2 are computed, as follows:

A first vector dissimilarity between wideband-based speaker cluster W1 and narrowband-based speaker cluster N1; A second vector dissimilarity between wideband-based speaker cluster W1 and narrowband-based speaker cluster N2; A third vector dissimilarity between wideband-based speaker cluster W2 and narrowband-based speaker cluster N1;

A fourth vector dissimilarity between the first bandwidth-based speaker cluster W2 and narrowband-based speaker cluster N2;

A fifth vector dissimilarity between wideband-based speaker cluster W3 and narrowband-based speaker cluster N1; and A sixth vector dissimilarity between wideband-based speaker cluster W3 and narrowband-based speaker cluster N2.

When the number of speakers is not known, each of the first to the sixth vector dissimilarities may be compared with a predetermined dissimilarity threshold, and only the clusters having a vector dissimilarity that is less than the predetermined dissimilarity threshold is combined as the same cluster. For example, when the predetermined threshold is 0.4, and the first to the sixth vector dissimilarities are 0.2, 0.4, 0.6, 0.8, 0.9, and 0.7, respectively, only the wideband-based speaker cluster W1 and the narrowband-based speaker cluster N1 (which have the vector dissimilarity of 0.2 less than the predetermined dissimilarity threshold of 0.4) are clustered as the same cluster (e.g., cluster 1), so that the total number of clusters become four (4).

When the number of speakers in the audio stream is known, a clustering algorithm is applied to identify a pair of speaker clusters having a dissimilarity score that is less than the predetermined dissimilarity threshold, and to combine them as the same cluster, until the total number of clusters becomes the number of speakers. For example, after combining the wideband-based speaker cluster W1 and the narrowband-based speaker cluster N1 as the same cluster, the total number of clusters is compared with the number of speakers. If the total number of clusters (e.g., 4) becomes equal to the number of speakers, operation S160 stops. If not, the predetermined dissimilarity threshold is increased, for example, from 0.4 to 0.5, and operation S160 is performed based on the increased dissimilarity threshold of 0.5, to combine the wideband-based speaker cluster W1 and the narrowband-based speaker cluster N2 (which have the vector dissimilarity of 0.4 less that the increased dissimilarity threshold of 0.5) as the same cluster. If the total number of clusters (e.g., 3) becomes equal to the number of speakers, operation S160 stops. If not, the predetermined dissimilarity threshold is increased again, for example, from 0.5 to 0.6, and operation S160 is iteratively performed.

In operation S170, the bandwidth-dependent speaker clusters W1-W3, N1, and N2 are merged into clusters 1-4 based on the speaker identification assigned to each of the bandwidth-dependent speaker clusters. For example, wideband-based speaker cluster W3 and narrowband-based speaker cluster N1 are identified as belonging to the same speaker identity based on the fifth vector dissimilarity, and the same speaker identity no. 3 is assigned to speaker cluster W3 and N1. As a result, the five speaker clusters W1-W3, N1, and N2 are merged into four final clusters 1-4, wherein the same speaker identity no. 3 is assigned to speaker clusters N1 and W3, and different speaker identity nos. 1, 2, and 4 are given to the rest of the speaker clusters W1, W2, and N2, respectively.

Figure 7:
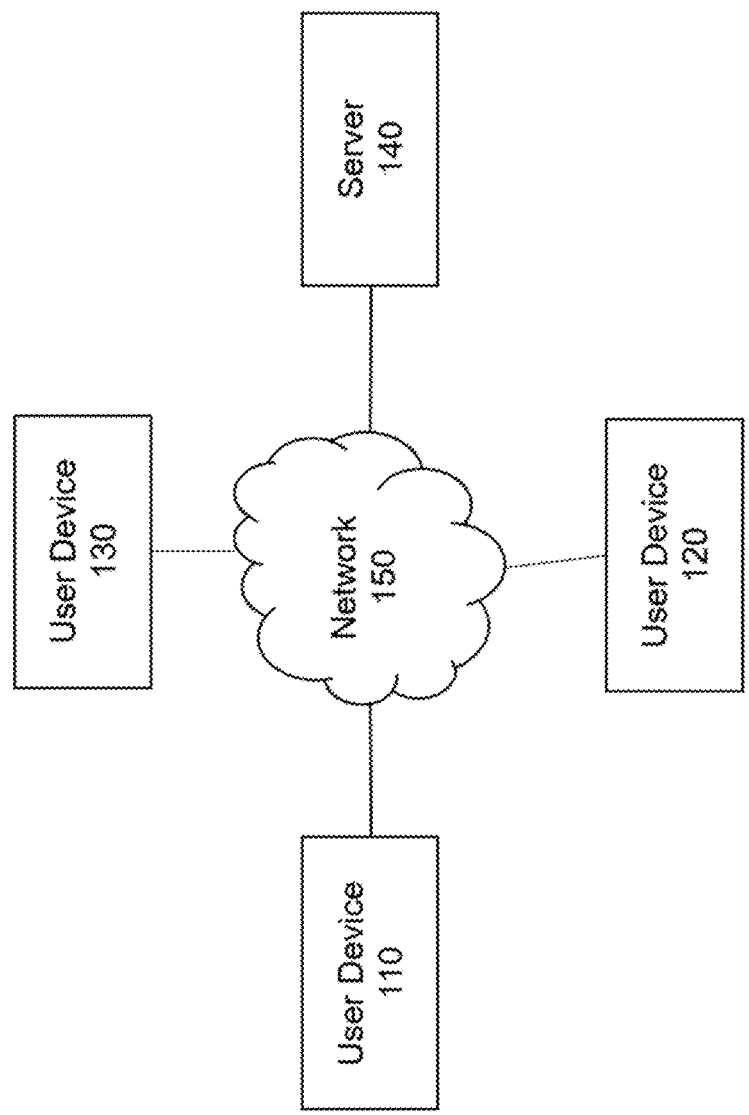
FIG. 7 is a diagram of devices for performing speaker diarization according to embodiments.

FIG. 7 is a diagram of devices for performing speaker diarization according to embodiments of the present disclosure. FIG. 7 includes user devices 110, 120, 130, a server 140, and a network 150. The user devices 110, 120, 130 and the server 140 may interconnect via wired connections, wireless connections, or a combination of wired and wireless connections.

Each of the user devices 110, 120, 130 includes one or more devices configured to receive and process an acoustic signal. For example, each of the user devices 110, 120, 130 may include a computing device (e.g., a desktop computer, a laptop computer, a tablet computer, a handheld computer, a smart speaker, a server, etc.), a mobile phone (e.g., a smart phone, a radiotelephone, etc.), an audio recorder, a wearable device (e.g., a pair of smart glasses or a smart watch), or a similar device. Each of the user devices 110, 120, 130 may perform all or some of operations S110-S170 described with reference to FIGS. 1-6. For example, the user devices 110, 120, 130 may include a microphone, a speaker, and a processor to allow users to conduct an audio conference or a video conference with each other via the server 140, and may perform operations S110-S170 in processing an acoustic signal that is received during the audio conference or the video conference. The user devices 110, 120, 130 may perform operations S110-S170 to analyze an audio recording (e.g., a voicemail) and to provide a transcript of the audio recording.

The server 140 may store bandwidth-dependent speaker embedding extraction models according to embodiments. For example, the server 140 may be a server, a computing device, or the like. The server 140 may receive an audio signal from an external device (e.g., the user devices 110, 120, 130 or another external device), train a neural network for extracting speaker embeddings from the audio signal, and provide the trained neural network to the user devices 110, 120, 130 to permit the user devices 110, 120, 130 to extract speaker embeddings using the neural network. Further, the server 140 may perform all or some of operations S110-S170 described in FIGS. 1-6.

The network 150 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) may perform one or more functions described as being performed by another set of devices.

Figure 8:
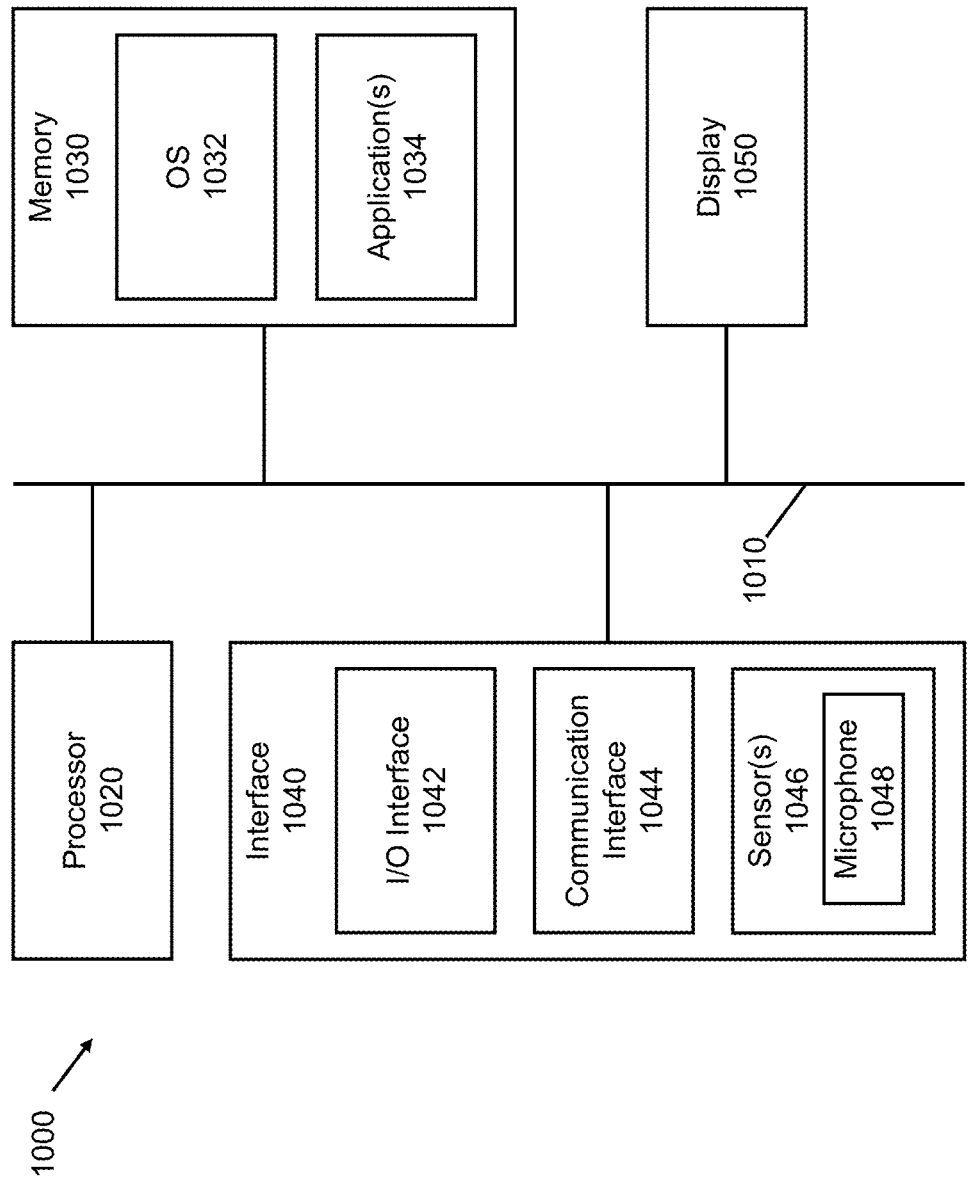
FIG. 8 is a diagram of components of one or more devices of FIG. 7 according to embodiments.

FIG. 8 is a diagram of components of one or more devices of FIG. 8 according to an embodiment. An electronic device 1000 may correspond to the user device 110, 120, or 130, and/or the server 140.

FIG. 8 is for illustration only, and other embodiments of the electronic device 1000 could be used without departing from the scope of this disclosure.

The electronic device 1000 includes a bus 1010, a processor 1020, a memory 1030, an interface 1040, and a display 1050.

The bus 1010 includes a circuit for connecting the components 1020 to 1050 with one another. The bus 1010 functions as a communication system for transferring data between the components 1020 to 1050 or between electronic devices.

The processor 1020 includes one or more of a central processing unit (CPU), a graphics processor unit (GPU), an accelerated processing unit (APU), a many integrated core (MIC), a field-programmable gate array (FPGA), or a digital signal processor (DSP). The processor 1020 is able to perform control of any one or any combination of the other components of the device 1000, and/or perform an operation or data processing relating to communication. The processor 1020 executes one or more programs stored in the memory 1030, to perform operations S110-S170 illustrated in FIGS. 1-6 according to embodiments of the present disclosure.

The memory 1030 may include a volatile and/or non-volatile memory. The memory 1030 stores information, such as one or more of commands, data, programs (one or more instructions), a speech separation model shown in FIGS. 3A and 3B, neural networks, a neural network shown in FIG. 4, and applications 1034, etc., which are related to at least one other component of the electronic device 1000 and for driving and controlling the electronic device 1000. For example, commands and/or data may formulate an operating system (OS) 1032. Information stored in the memory 1030 may be executed by the processor 1020.

The applications 1034 include the above-discussed embodiments. These functions can be performed by a single application or by multiple applications that each carry out one or more of these functions.

The display 1050 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 1050 can also be a depth-aware display, such as a multi-focal display. The display 1050 is able to present, for example, various contents, such as text, images, videos, icons, and symbols.

The interface 1040 includes input/output (I/O) interface 1042, communication interface 1044, and/or one or more sensors 1046. The I/O interface 1042 serves as an interface that can, for example, transfer commands and/or data between a user and/or other external devices and other component(s) of the device 1000.

The sensors 1046 can meter a physical quantity or detect an activation state of the electronic device 1000 and convert metered or detected information into an electrical signal. For example, the sensors 1046 can include one or more microphones 1048 or other imaging sensors for capturing images of scenes. The sensors 1046 can also include any one or any combination of a microphone, a keyboard, a mouse, and one or more buttons for touch input. In addition, the sensors 1046 can include a control circuit for controlling at least one of the sensors included herein. Any of these sensors 1046 can be located within or coupled to the electronic device 1000. The sensors 1046 may be used to detect touch input, gesture input, and hovering input, using an electronic pen or a body portion of a user, etc.

The communication interface 1044, for example, is able to set up communication between the electronic device 1000 and an external electronic device. The communication interface 1044 can be a wired or wireless transceiver or any other component for transmitting and receiving signals.

Figure 9:
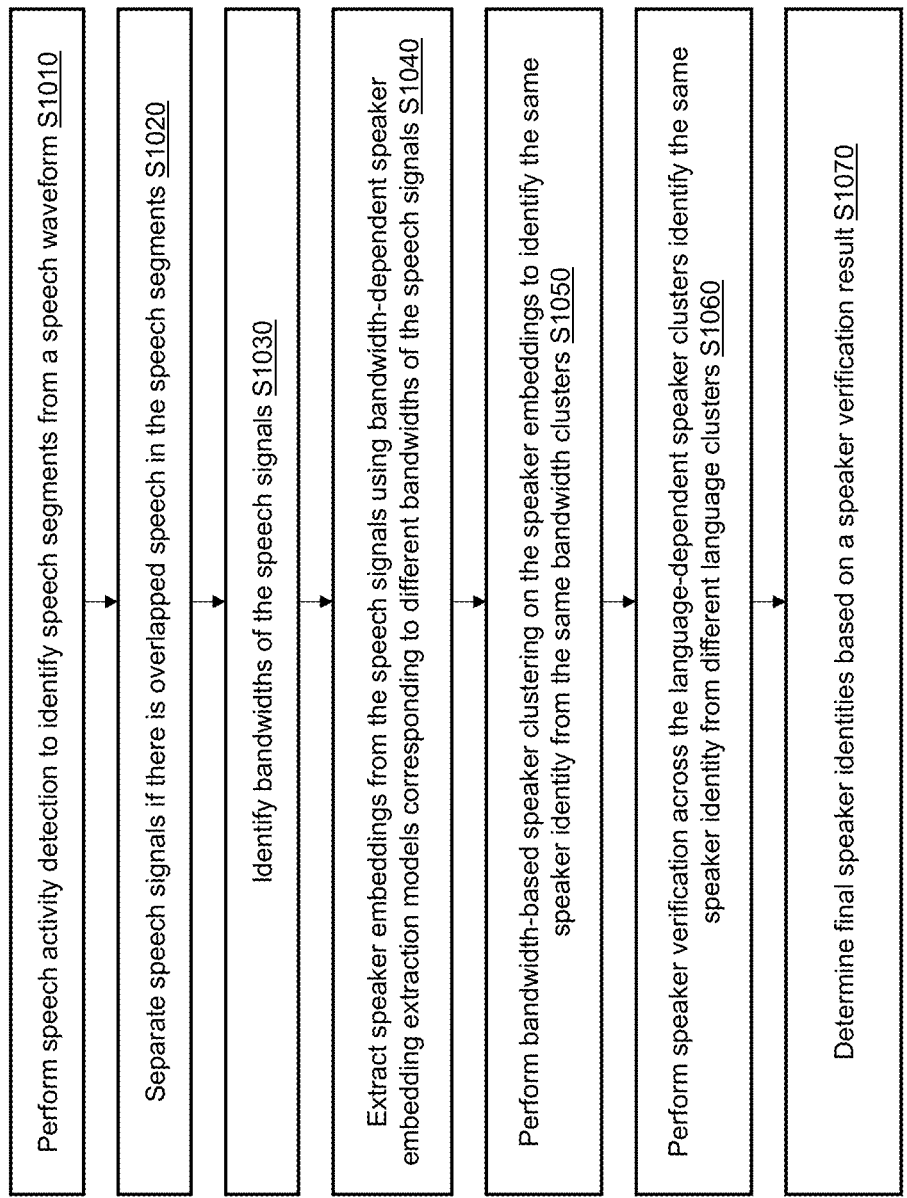
FIG. 9 is a flowchart illustrating a method of performing speaker diarization according to embodiments.

FIG. 9 is a flowchart illustrating a method of performing speaker diarization according to embodiments.

In operation S1010, the processor 1020 may detect speech activities from an audio stream, for example, based on a Gaussian mixture model, a hidden Markov model, or a multi-layer perceptron model.

In operation S1020, the processor 1020 may separate speech signals from the audio stream if the speech signals are overlapped with each other in a time domain. For example, the processor 1020 may execute the deep learning-based speech separation model shown in FIG. 2, to separate overlapped speech signals.

In operation S1030, the processor 1020 may identify a bandwidth corresponding to each of the speech signals.

In operation S1040, the processor 1020 may extract speaker embeddings from the speech signals by mapping the speech signals to corresponding bandwidth-dependent speaker embedding extraction models, based on a bandwidth classification of each of the speech signals. When the speech signal is identified as a wideband signal, a wideband-based speaker embedding extraction model is used to extract speaker embeddings from the wideband speech signal. When the speech signal is identified as a narrowband signal, a narrowband-based speaker embedding extraction model is used to extract speaker embeddings from the narrowband speech signal. The wideband-based speaker embedding extraction model and the narrowband-based speaker embedding extraction model may have the same neural network structure, for example, as shown in FIG. 4, but may be trained using different bandwidth signals. The wideband-based speaker embedding extraction model may be trained using sample wideband speech signals, and the narrowband-based speaker embedding extraction model may be trained using sample narrowband speech signals.

In operation S1050, the processor 1020 may cluster the extracted speaker embeddings per bandwidth, as bandwidth-dependent speaker clusters, to determine speech segments that belong to the same speaker identities per bandwidth. The processor 1020 may use a hierarchical clustering algorithm as shown in FIG. 5 to obtain the bandwidth-dependent speaker clusters.

In an embodiment, the processor 1020 may calculate dissimilarity scores between all pairs of speaker embedding vectors. The processor 1020 may identify a pair of speaker embedding vectors having the lowest dissimilarity score, among the calculated dissimilarity scores. The processor 1020 may cluster the pair of speaker embedding vectors having the lowest dissimilarity score as the same cluster if the minimum dissimilarity score is less than a predetermined dissimilarity threshold. The processor 1020 may iteratively perform the clustering until the lowest dissimilarity score becomes higher than a preset dissimilarity threshold. When the processor 1020 performs clustering per bandwidth, the processor 1020 may not have information of the number of speakers per bandwidth, and therefore may use the dissimilarity threshold as a reference point for stopping the clustering operation. If the processor 1020 has information of the number of total speakers in an audio stream and if the total number of bandwidth-dependent speaker clusters is less than the number of total speakers, the dissimilarity threshold is decreased and the clustering is repeated until the total number of bandwidth-dependent speaker clusters reaches the number of total speakers. However, if the processor 1020 has information of the number of speakers per bandwidth, the processor 1020 may iteratively perform the bandwidth-dependent speaker clustering per bandwidth until the number of clusters per bandwidth becomes the number of total speakers per bandwidth.

In operation S1060, the processor 1020 may perform a cross-bandwidth speaker verification on the bandwidth-dependent speaker clusters to determine if there is the same speaker in the bandwidth-dependent speaker clusters of different bandwidths. For example, the processor 1020 may calculate vector similarities or vector dissimilarities between a plurality of pairs of wideband-based speaker clusters and narrowband-based speaker clusters to identify the same speaker from the different bandwidth-based speaker clusters. The processor 1020 may assign final speaker IDs to the bandwidth-dependent speaker clusters based on the vector similarities or the vector dissimilarities between the plurality of pairs of the wideband-based speaker clusters and the narrowband-based speaker clusters.

In operation S1070, the processor 1020 may combine the bandwidth-dependent speaker clusters based on the final speaker IDs. The bandwidth-dependent speaker clusters having the same final speaker ID may be collapsed into a single cluster.

In an embodiment, the processor 1020 may recognize the number of speakers in the audio stream that is recorded and stored in the memory 1030, or the number of attendees that participate in an audio or video meeting in which the audio stream is received. Based on the number of speakers or attendees, the processor 1020 may determine when to stop the clustering operation. While clustering the speaker embeddings, the processor 1020 may determine whether the current number of clusters reaches the number of speakers or attendees, and if so, may stop further clustering the speaker embeddings. However, if the processor 1020 does not have information of the number of speakers or attendees, the processor 1020 may determine to stop the clustering operation based on a dissimilarity score threshold.

Figure 10:
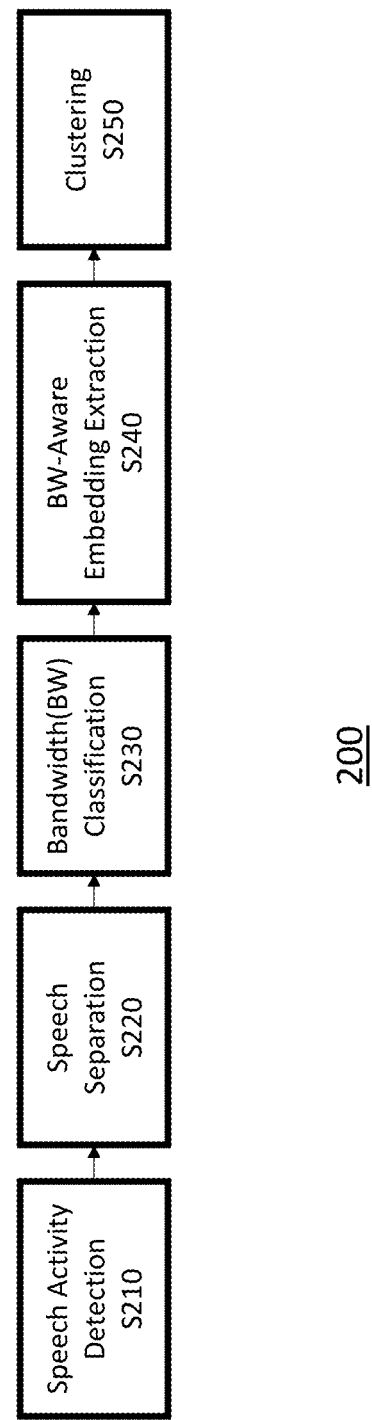
FIG. 10 illustrates a method of performing speaker diarization on mixed-bandwidth speech signals, according to other embodiments of the disclosure.
Figure 11:
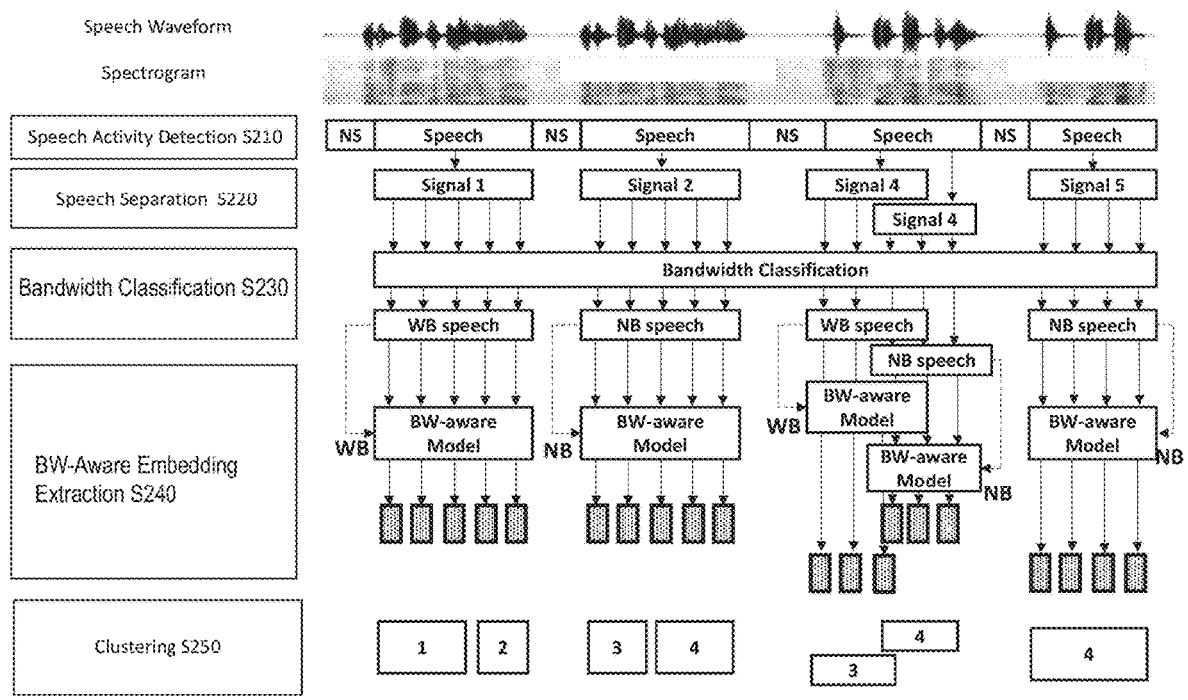
FIG. 11 illustrates an overall speaker diarization process according to other embodiments.
Figure 12:
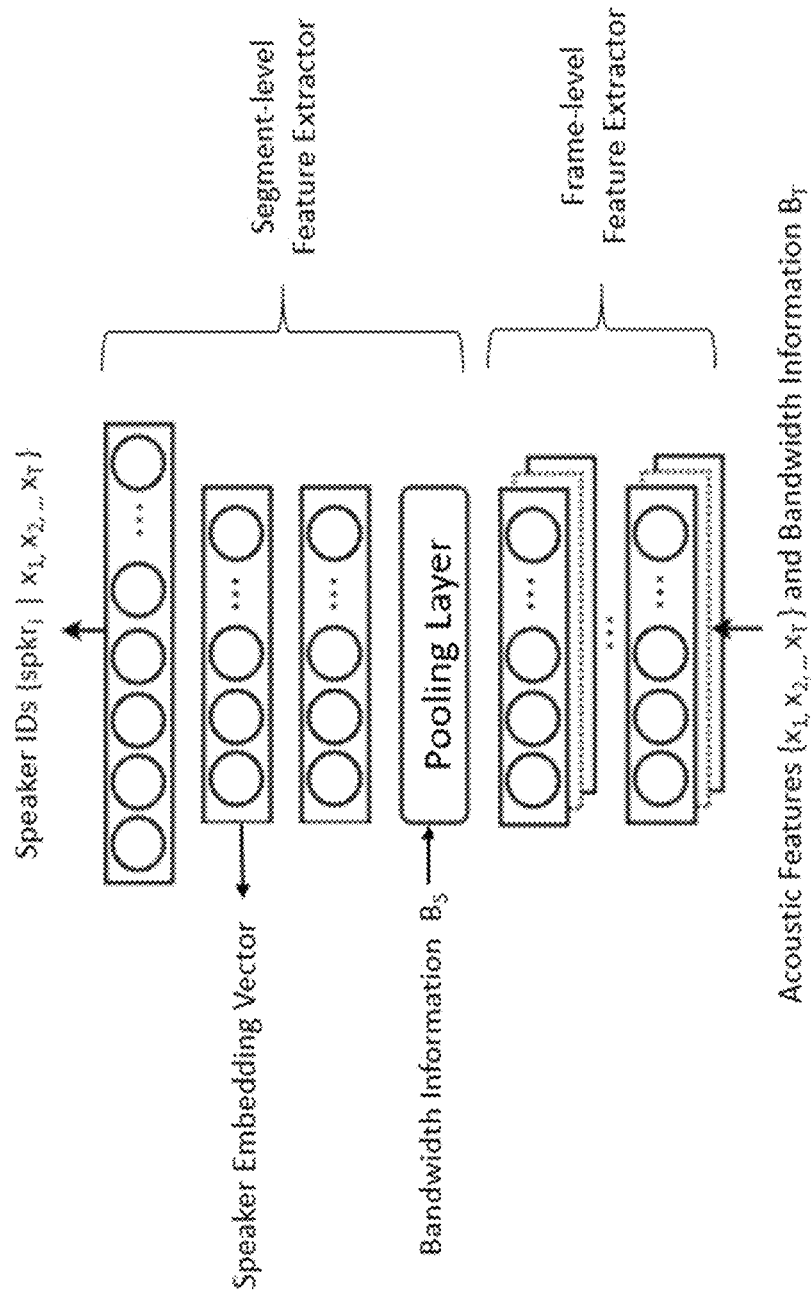
FIG. 12 is a diagram illustrating a method of performing a speaker embedding extraction according to other embodiments.

FIGS. 10 and 11 illustrate a method of performing speaker diarization based on bandwidth classification, and FIG. 12 illustrates a bandwidth-aware speaker embedding extraction model, according to other embodiments of the disclosure.

As shown in FIG. 10, a method 200 of performing speaker diarization includes operation S210 of detecting speech activities from an audio stream, operation S220 of separating overlapped speech signals, operation S230 of identifying a bandwidth corresponding to each of the speech signals, operation S240 of extracting speaker embeddings from the speech signals using a bandwidth-aware speaker embedding extracting model, operation S250 of clustering the speaker embeddings. Operations S210-S250 illustrated in FIG. 10 may be performed by at least one processor included in any type of electronic device, for example, a smartphone, a laptop computer, a personal computer (PC), a smart television, a server, and the like. For example, some or all of operations S210-S250 may be performed by the user device 110 or the server 140 shown in FIG. 7. Operation S220 may be omitted if there is no overlapped speech in a speech segment.

Operations S210-S230 may be substantially the same as operations S110-S130, and therefore redundant descriptions will be omitted.

Referring to FIG. 11, in operation S240, speech signals 1-5 which are identified as wideband speech signals and narrowband speech signals, respectively, are processed using a bandwidth-aware speaker embedding extraction model, to extract speaker embeddings from the wideband speech signals and the narrowband speech signals. When processing speech signal 1 which is identified as a wideband speech signal, the bandwidth-aware speaker embedding extraction model may receive, as input, bandwidth classification information WB of speech signal 1 as well as speech signal 1, and may extract speaker embeddings from speech signal 1 based on bandwidth classification information WB. When processing speech signal 2 which is identified as a narrowband speech signal, the bandwidth-aware speaker embedding extraction model may receive, as input, bandwidth classification information NB of speech signal 2 in addition to speech signal 2, and may extract speaker embeddings from speech signal 2 based on bandwidth classification information NB.

Referring to FIG. 12, the bandwidth-aware speaker embedding extraction model includes one or more neural networks. For example, the bandwidth-aware speaker embedding extraction includes frame-level layers, a statistics pooling layer, and segment-level layers.

The frame-level feature layers receive, as input, frame-level acoustic features (e.g., features extracted from 10 ms time windowed frames), for example such as Mel-filter bank energies, Mel-frequency cepstral coefficients, and bandwidth information of an input speech signal. The frame-level acoustic features are represented as $x_1, x_2, \ldots x_T$ (e.g., 15 dimensional acoustic feature vectors), wherein T is the number of frames, and the bandwidth information is represented as $L_T$ (e.g., 1 dimensional bandwidth feature vector). For example, when the length of the input speech signal is 1.5 seconds, the speech signal is split into 150 frames, each having the length of 10 ms. The acoustic features extracted from 150 frames, a 16×150 matrix representing $\{[x_1, L_T], [x_2, L_T] \ldots, [x_{150}, L_T]\}$, where $[x_t, L_T]$ represents an augmented vector of $x_t$ and $L_T$, may be input to a first layer (i.e., an input layer) of the frame-level feature layers, as the frame-level acoustic features.

The frame-level feature layers may be constituted with a deep neural network such as a convolutional neural network or time-delayed neural network, and may output frame-level activations, $f_1, f_2, \ldots f_n$.

The statistics pooling layer may aggregate the frame-level activations $f_1, f_2, \ldots f_n$ over a segment (e.g., 1.5 seconds). For example, the statistics pooling layer may compute a mean and standard deviation of the frame-level activations $f_1, f_2, \ldots f_n$ and may reduce them to a segment vector. The bandwidth classification information $B_s$ of the input signal may be appended to the segment vector. The bandwidth classification information $B_T$ and $B_s$ may contain the same information, but are input to different layers, the input layer of the frame-level feature layers, and the plurality of segmentation-level layers.

The segment-level layers may include a plurality of hidden layers followed by a softmax output layer. The plurality of hidden layers may be fully connected layers. A speaker embedding (e.g., a speaker embedding vector) may be output from the last hidden layer, among the plurality of layers, and a speaker identification may be output from the softmax output layer.

The bandwidth-aware speaker embedding extraction model according to an embodiment may be trained using speech signals of a plurality of different bandwidths and bandwidth classification information of the speech signals, to extract speaker embeddings regardless of the bandwidths of the speech signals.

Referring back to FIGS. 10 and 11, in operation S250, the speaker embeddings are iteratively clustered based on vector similarities or vector dissimilarities between all pairs of the speaker embeddings. For example, a bottom-up clustering method such as an agglomerative hierarchical clustering (AHC) method or a spectral clustering method may be used to cluster the speaker embeddings. Referring to FIG. 11, the speaker embeddings are grouped into four clusters 1-4 that belong to four different speakers, through the iterative clustering process.

Figure 13:
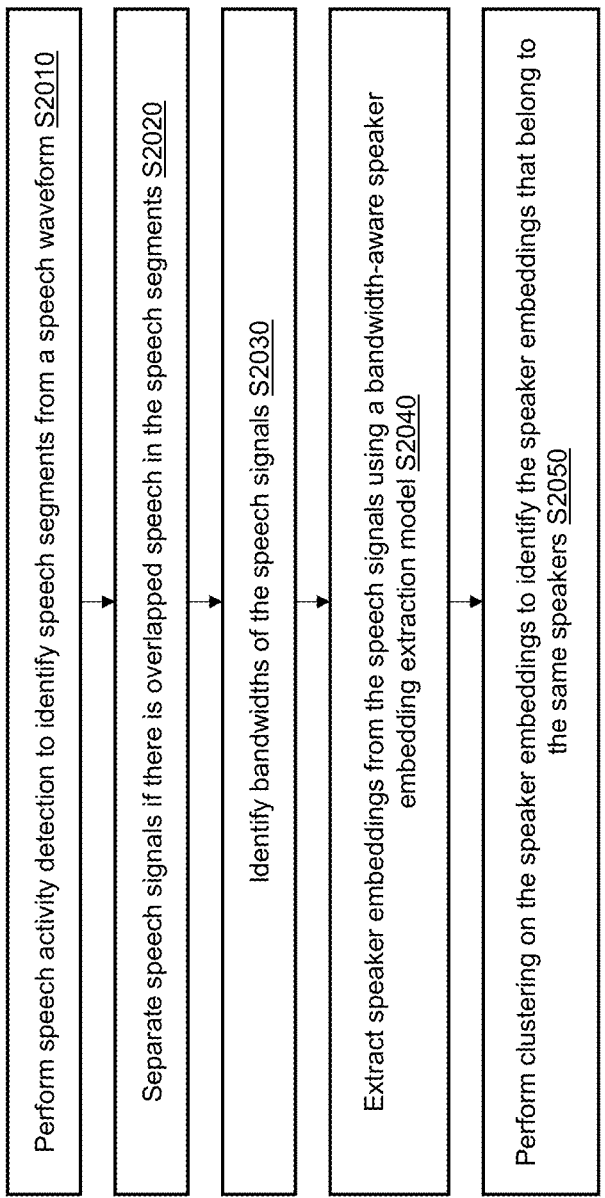
FIG. 13 is a flowchart illustrating a method of performing speaker diarization according to other embodiments.

FIG. 13 is a flowchart illustrating a method of performing speaker diarization according to other embodiments.

Operations S2010-S2030 may be substantially the same as operations S1010-S1030 and therefore redundant descriptions will be omitted.

In operation S2040, the processor 1020 may extract speaker embeddings from speech signals using a bandwidth-aware speaker embedding extraction model. The processor 1020 may feed, as input, a speech signal and a bandwidth classification of the speech signal to the bandwidth-aware speaker embedding extraction model, to obtain speaker embeddings as an output of the bandwidth-aware speaker embedding extraction model. The bandwidth-aware speaker embedding extraction model may include frame-level layers, a statistics pooling layer, and segment-level layers as shown in FIG. 12. Referring to FIG. 12, the speech signal is input to the frame-level layers, and the bandwidth classification may be input to the frame-level layers and also to the segment-level layers. The speaker embeddings may be output from the last hidden layer of the segment-level layers.

Referring back to FIG. 13, in operation S2050, the processor 1020 may iteratively cluster the speaker embeddings based on vector similarities or vector dissimilarities between all pairs of the speaker embeddings to identify the speaker embeddings that correspond to the same speaker identities. For example, the processor 1020 may use an agglomerative hierarchical clustering (AHC) method to cluster the speaker embeddings.

The processor 1020 may iteratively perform the clustering until the lowest dissimilarity score becomes higher than a preset dissimilarity threshold, or the number of clusters becomes a present number, which represents the number of speakers in the audio signal. When the number of speakers is known, or the processor 1020 is capable of determining the number of speakers from the audio signal, the processor 1020 may stop clustering when the number of clusters becomes the number of speakers. The processor 1020 may otherwise stop clustering when the lowest dissimilarity score becomes higher than a preset dissimilarity threshold.

Operations S2010-S2050 may be performed by at least one processor included in any type of electronic device, for example, a smartphone, a laptop computer, a personal computer (PC), a smart television, a server, and the like. For example, some or all of S2010-S2050 may be performed by the user device 110 or the server 140 shown in FIG. 7.

FIGS. 14-17 illustrate a method of performing speaker diarization based on an attention-based bandwidth-agnostic embedding extraction model, according to other embodiments of the disclosure.

Figure 14:
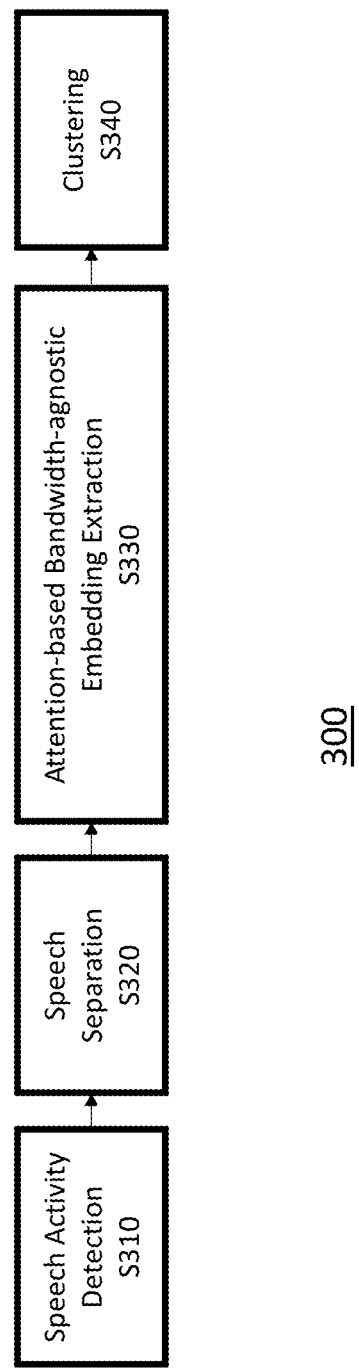
FIG. 14 illustrates a method of performing speaker diarization on mixed-bandwidth speech signals, according to other embodiments of the disclosure.

As shown in FIG. 14, a method 300 of performing speaker diarization includes operation S310 of detecting speech activities from an audio stream, operation S320 of separating overlapped speech signals, operation S330 of extracting speaker embeddings from the speech signals using an attention-based bandwidth-agnostic speaker embedding extraction model, and operation S340 of clustering the speaker embeddings. Operations S310-S340 illustrated in FIG. 14 may be performed by at least one processor included in any type of electronic device, for example, a smartphone, a laptop computer, a personal computer (PC), a smart television, a server, and the like. For example, some or all of operations S310-S340 may be performed by the user device 110 or the server 140 shown in FIG. 7.

Operations S310 and S320 may be substantially the same as operations S110 and S120, and therefore redundant descriptions will be omitted.

Figure 15:
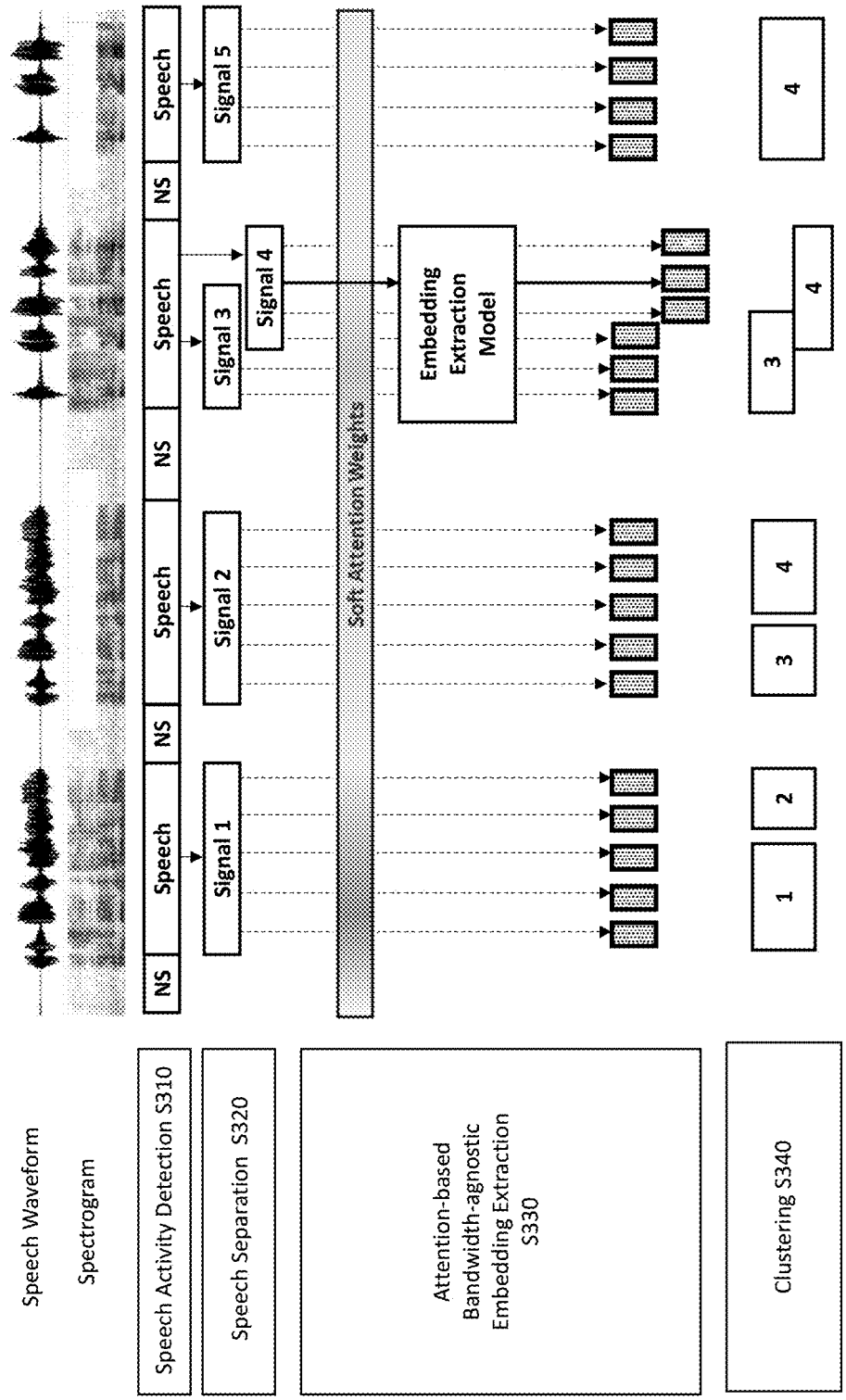
FIG. 15 illustrates an overall speaker diarization process according to other embodiments.

Referring to FIGS. 14 and 15, in operation S330, speech signals 1-5 are processed using an attention-based bandwidth-agnostic speaker embedding extraction model, to extract speaker embeddings from speech signals 1-5, without using bandwidth classification information of speech signals 1-5.

For example, when speaker embeddings are extracted from speech signal 4 at the current processing time, the attention-based bandwidth-agnostic speaker embedding extraction model may determine and apply soft attention weights to other speech signals 1-3 and 5 based on a result of comparison between speech signal 4 and each of speech signals 1-3 and 5.

Figure 16:
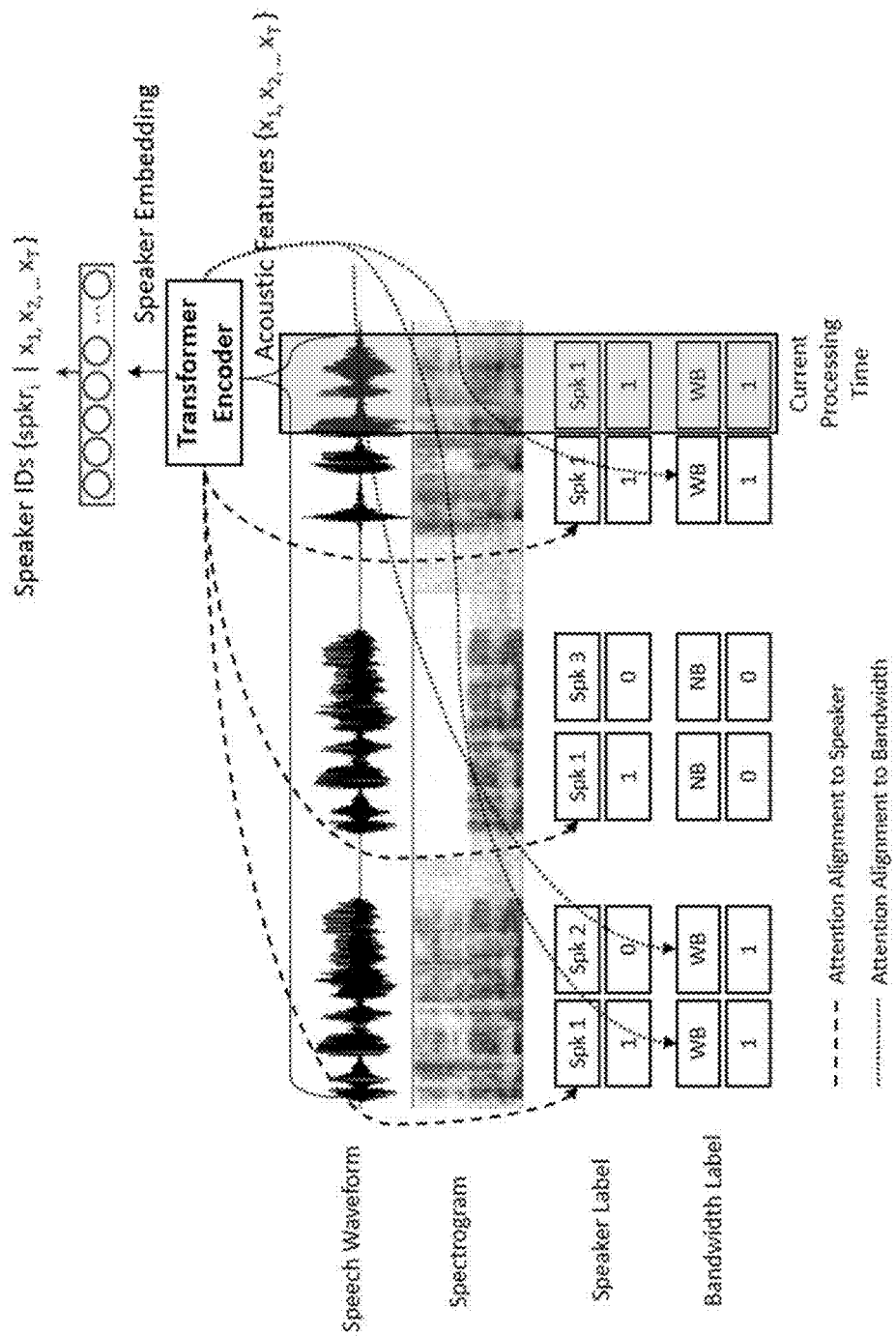
FIG. 16 is a diagram illustrating a method of performing a speaker embedding extraction according to other embodiments.

Referring to FIG. 16, the bandwidth-agnostic speaker embedding extraction model may use a transformer encoder including one or more neural networks configured to extract speaker embeddings from a mixed bandwidth speech signal.

The transformer encoder may be trained using mixed bandwidth speech signals from which non-speech segments are filtered out. The transformer encoder is trained to predict an embedding for a speech segment at the current processing time (or a target processing time), while a first attention head of the transformer encoder attends to other speech segments having the same bandwidth identity as the current speech segment, and a second attention head of the transformer encoder attends to other speech segments having the same speaker identity as the current speech segment, to minimize a loss function L.

The loss function L of the transformer encoder may be computed by adding a standard cross-entropy loss and an attention alignment loss to speaker and bandwidth. For example, the loss function L of the transformer encoder may be computed based on the following equation (1):

$$L = L_{CE} + \lambda_1 L_a^{BW}(A^{BW}) + \lambda_2 L_a^{Spk}(A^{Spk}) \quad \text{Equation (1)}$$

Where $L_{CE}$ denotes a standard cross-entropy (CE) loss with respect to a speaker identity label, $L_a^{BW}(A^{BW})$ denotes an attention alignment loss with respect to a bandwidth alignment, $L_a^{Spk}(A^{Spk})$ denotes an attention alignment loss with respect to a speaker ID alignment, and $\lambda_1$ and $\lambda_2$ denote control weights for $L_a^{BW}(A^{BW})$ and $L_a^{Spk}(A^{Spk})$, respectively.

The standard cross-entropy (CE) loss may be computed based on the following equation (2):

$$L_{CE} = \frac{-1}{T} \sum_{t=1}^{T} \sum_{s=1}^{S} I_{t,s} \log(P_{t,s}) \quad \text{Equation (2)}$$

Where $I_{t,s}$ is an indicator which is 1 if speaker s is at time t, otherwise 0, $P_{t,s}$ is a probability of speaker s at time t, T is the length of timestamps, and S is the number of training speakers.

The standard cross-entropy (CE) loss $L_{CE}$ models speaker representation ability. The attention alignment loss $L_a^{Spk}(A^{Spk})$ enables the transformer encoder to focus on modeling acoustic characteristics from the same speaker if there is the same speaker at past time steps and thereby to enhance discriminative power of speech diarization. The attention alignment loss $L_a^{BW}(A^{BW})$ enables the transformer encoder to focus on modeling acoustic characteristics depending on bandwidths.

The attention alignment losses $L_a^{BW}(A^{BW})$ and $L_a^{Spk}(A^{Spk})$ with respect to bandwidth and speaker is computed based on the following equation (3):

$$L_a(A) = \frac{-1}{T} \sum_{t=1}^{T} \sum_{j=1}^{J} G_{t,j}^p \log(A_{t,j}) \quad \text{Equation (3)}$$

Where G denotes a 0-1 matrix in which each element is either 0 or 1 such that $G_{t,j}=1$ if a bandwidth or a speaker identity at j-th time step is the same as a bandwidth or a speaker identity at the current time step t. In a training phase, the transformer encoder is aware which speech part is a wideband or a narrowband, and is also aware of a speaker identity. Therefore, G is referred to as a labeled alignment. The rows of matrix G may be normalized to have a labeled alignment distribution, $G^p$.

In Equation (3), A denotes an attention probability matrix computed by an alignment head. At every target time step t, the transformer encoder is trained to minimize Kullback-Leibler (KL) divergence between $G^p$ and A which is represented as the attention alignment loss in Equation (3). The attention alignment loss in Equation (3) may be also referred to as KL divergence loss.

Referring to FIG. 16, the transformer encoder identifies a speaker identity and a bandwidth of a speech segment at the current processing time, as speaker 1 and wideband WB.

In attending to speakers, the transformer encoder may assign a first value (e.g., value 1) to the speech segment at the current processing time, and also to other speech segments at past processing times which have the same speaker identity (e.g., speaker 1) as the current speech segment. The transformer encoder may assign a second value (e.g., value 0) to the rest of speech segments which have different speaker identities (e.g., speakers 2 and 3) from the speaker identity (e.g., speaker 1) of the current speech segment.

In attending to bandwidths, the transformer encoder may assign the first value (e.g., value 1) to the speech segment at the current processing time, and also to other speech segments at past processing times which have the same bandwidth identity (e.g., wideband WB) as the current speech segment. The transformer encoder may assign the second value (e.g., value 0) to the rest of speech segments which have a different bandwidth identity (e.g., narrowband NB) from the bandwidth identity (e.g., wideband WB) of the current speech segment.

In this manner, the transformer encoder may extract speaker embeddings from the speech signals by minimizing the attention alignment loss with respect to the speaker identity alignment and the bandwidth identity alignment.

Referring back to FIG. 14, in operation S340, the speaker embeddings are iteratively clustered based on vector similarities or vector dissimilarities between all pairs of the speaker embeddings. For example, a bottom-up clustering method such as an agglomerative hierarchical clustering (AHC) method may be used to cluster the speaker embeddings.

Figure 17:
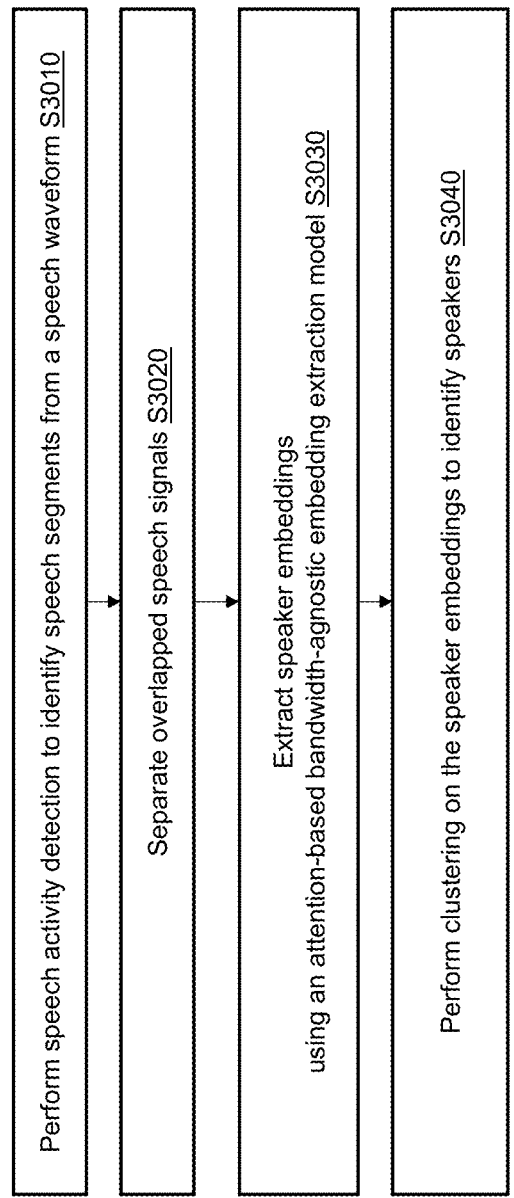
FIG. 17 is a flowchart illustrating a method of performing speaker diarization according to other embodiments.

FIG. 17 is a flowchart illustrating a speaker diarization process based on an attention-based bandwidth-agnostic embedding extraction model.

Operations S3010 and S3020 may be substantially the same as operations S1010 and S1020 and therefore redundant descriptions will be omitted.

In operation S3030, the processor 1020 may extract speaker embeddings from speech signals using an attention-based bandwidth-agnostic embedding extraction model. The processor 1020 may identify past speech segments having the same speaker identity as the current speech segment, and may identify past speech segments having the same bandwidth as the current speech segment. The processor 1020 may assign the same speaker label and the same bandwidth label to the past speech segments having the same speaker identity and the same bandwidth identity as the current speech segment, respectively. The processor 1020 may set or adjust soft attention weights of the attention-based bandwidth-agnostic embedding extraction model, to attend to the past speech segments having the same speaker label and the same bandwidth label as the current speech segment. Based on the loss function according to equation (1), the processor 1020 may minimize differences between narrowband speaker embeddings and wideband speaker embeddings from the same speaker and may maximize differences between speaker embeddings from different speakers. Accordingly, the transformer encoder according to an embodiment may generate more reliable speaker embeddings from mixed bandwidth speech signals, compared with conventional embedding extraction models.

In operation S3040, the processor 1020 may iteratively cluster the speaker embeddings based on vector similarities or vector dissimilarities between all pairs of the speaker embeddings to identify the speaker embeddings that correspond to the same speaker identities. For example, the processor 1020 may use an agglomerative hierarchical clustering (AHC) method to cluster the speaker embeddings.

The processor 1020 may iteratively perform the clustering until the lowest dissimilarity score becomes higher than a preset dissimilarity threshold, or the number of clusters becomes a present number, which represents the number of speakers in the audio signal. When the number of speakers is known, or the processor 1020 is capable of determining the number of speakers from the audio signal, the processor 1020 may stop clustering when the number of clusters becomes the number of speakers. The processor 1020 may otherwise stop clustering when the lowest dissimilarity score becomes higher than a preset dissimilarity threshold.

Operations S3010-S3040 may be performed by at least one processor included in any type of electronic device, for example, a smartphone, a laptop computer, a personal computer (PC), a smart television, a server, and the like. For example, some or all of S3010-S3040 may be performed by the user device 110 or the server 140 shown in FIG. 7.

FIGS. 18-21 illustrate a method of performing speaker diarization without using a speech activity detection algorithm, according to other embodiments of the disclosure.

Figure 18:
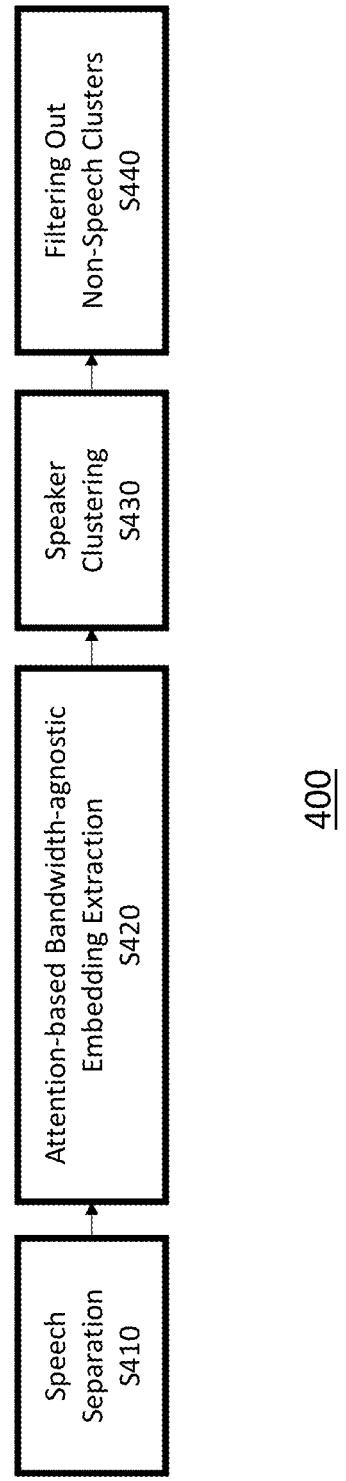
FIG. 18 illustrates a method of performing speaker diarization on mixed-bandwidth speech signals, according to other embodiments of the disclosure.
Figure 19:
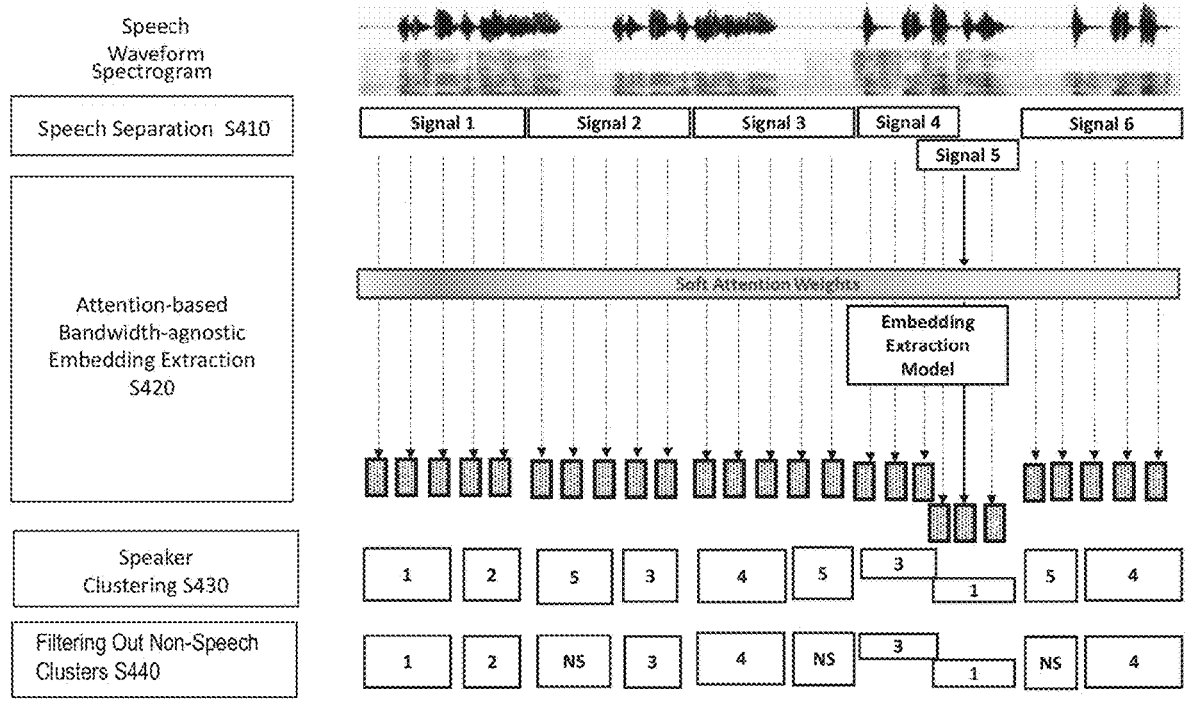
FIG. 19 illustrates an overall speaker diarization process according to other embodiments.

As shown in FIGS. 18 and 19, a method 400 may include operation S410 of separating overlapped speech signals, operation S420 of extracting speaker embeddings from the speech signals using an attention-based bandwidth-agnostic speaker embedding extraction model, operation S430 of clustering the speaker embeddings, and operation S440 of filtering out non-speech clusters. Operations S410-S440 illustrated in FIG. 18 may be performed by at least one processor included in any type of electronic device, for example, a smartphone, a laptop computer, a personal computer (PC), a smart television, a server, and the like. For example, some or all of operations S410-S440 may be performed by the user device 110 or the server 140 shown in FIG. 7.

Operation S410 may be substantially the same as operation S120, and therefore redundant descriptions will be omitted.

In this embodiment, a speech activity detection process may be omitted unlike the embodiments shown in FIGS. 1, 10, and 14.

Referring to FIGS. 18 and 19, in operation S420, speech signals 1-6 are processed using an attention-based bandwidth-agnostic speaker embedding extraction model, to extract speaker embeddings from speech signals 1-6, without using bandwidth classification information of speech signals 1-6.

For example, when speaker embeddings are extracted from speech signal 5 at the current processing time, the attention-based bandwidth-agnostic speaker embedding extraction model may determine and apply soft attention weights to other speech signals 1-4 and 6 based on a result of comparison between speech signal 4 and each of speech signals 1-4 and 6.

Figure 20:
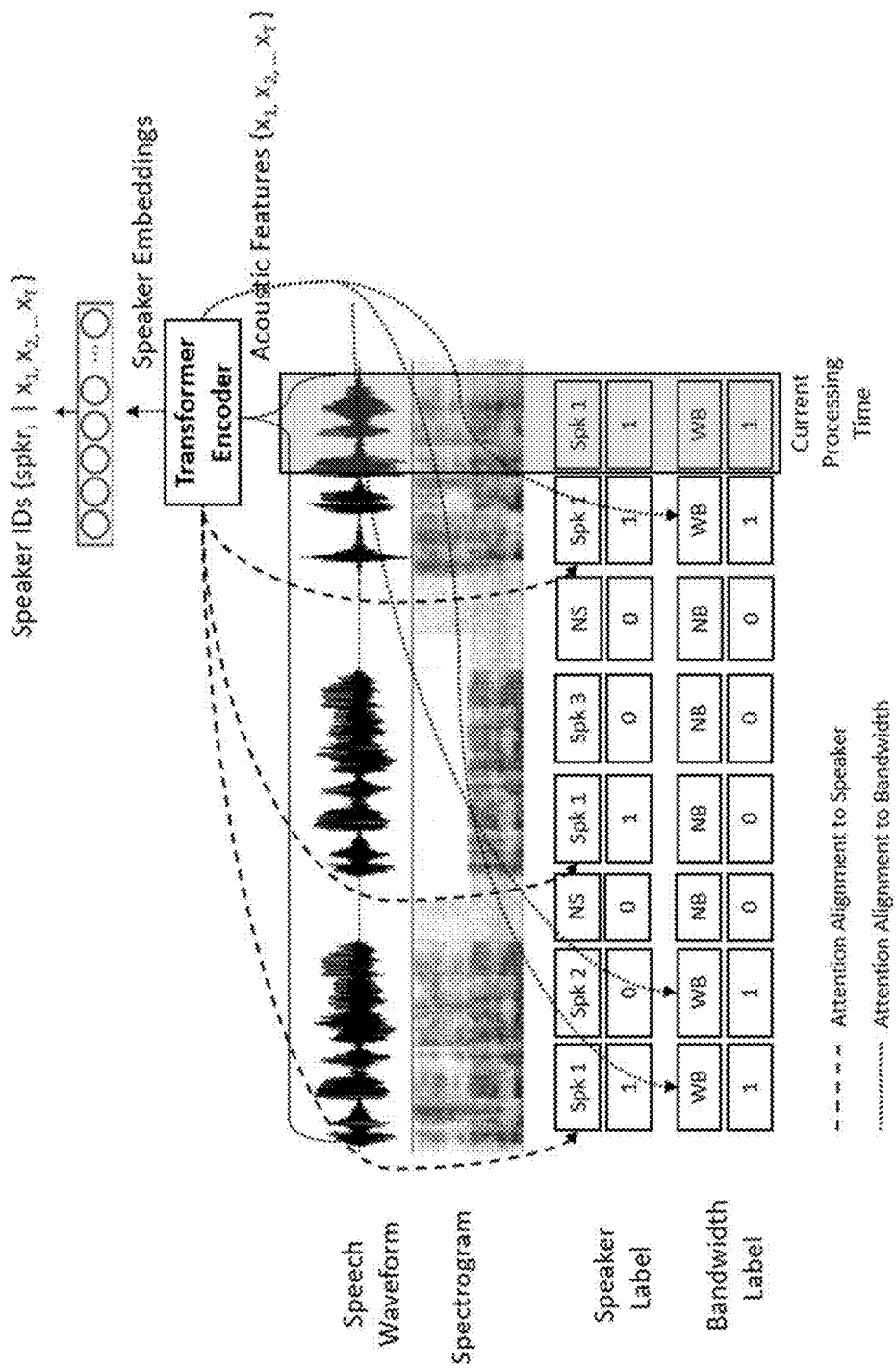
FIG. 20 is a diagram illustrating a method of performing a speaker embedding extraction according to other embodiments.

Referring to FIG. 20, the bandwidth-aware speaker embedding extraction model may use a transformer encoder including one or more neural networks configured to extract speaker embeddings from a mixed bandwidth speech signal.

The transformer encoder in the present embodiment may have the same or substantially the same structure as the transformer encoder in FIG. 16, but may be trained in a different manner. For example, the transformer encoder in FIG. 20 may be trained using mixed bandwidth signals with non-speech segments included therein. Additionally, a non-speech (NS) label may be used to train the transformer encoder in the present embodiment.

The transformer encoder is trained to predict an embedding for a speech segment at the current processing time (or a target processing time), while a first attention head of the transformer encoder attends to past speech segments having the same bandwidth identity as the current speech segment, and a second attention head of the transformer encoder attends to past speech segments having the same speaker identity as the current speech segment, to minimize a loss function L according to equation (1). The transformer encoder may not attend to past speech segments having different speaker identities and/or different bandwidth identities from the current speech segment. Also, the transformer encoder may not attend to non-speech segments.

In attending to bandwidths, the transformer encoder may assign a first value (e.g., value 1) to the speech segment at the current processing time, and also to other speech segments at past processing times which have the same bandwidth identity (e.g., wideband WB) as the current speech segment. The transformer encoder may assign a second value (e.g., value 0) to the rest of speech segments which have a different bandwidth identity (e.g., narrowband NB) from the bandwidth identity (e.g., wideband WB) of the current speech segment. Additionally, the transformer encoder may assign the second value (e.g., value 0) to non-speech (NS) segments if a speaker label at the current processing time is not NS, and may assign the first value (e.g., value 1) to the NS segments if the speaker label at the current processing time is NS, so that the transformer encoder may attend to only the past segments having the same speaker label and the same bandwidth label as those at the current processing time. The transformer encoder may set or adjust soft attention weights to focus on the past speech elements having the same value (e.g., value 0) as the current speech segment. In this manner, the transformer encoder may extract speaker embeddings from the speech signals by minimizing the attention alignment loss with respect to the speaker identity alignment and the bandwidth identity alignment.

Referring back to FIGS. 18 and 19, in operation S430, the speaker embeddings are iteratively clustered based on vector similarities or vector dissimilarities between all pairs of the speaker embeddings. For example, a bottom-up clustering method such as an agglomerative hierarchical clustering (AHC) method may be used to cluster the speaker embeddings.

In operation S440, non-speech clusters are filtered out from the speaker clusters. To filter out a non-speech cluster, a non-speech representative vector may be enrolled and vector similarity scores may be computed between the non-speech representative vector and speaker representative vectors of each speaker cluster. If a vector similarity score of a specific speaker cluster is larger than a predetermined threshold, the specific cluster is identified as a non-speech cluster and is filtered out.

Figure 21:
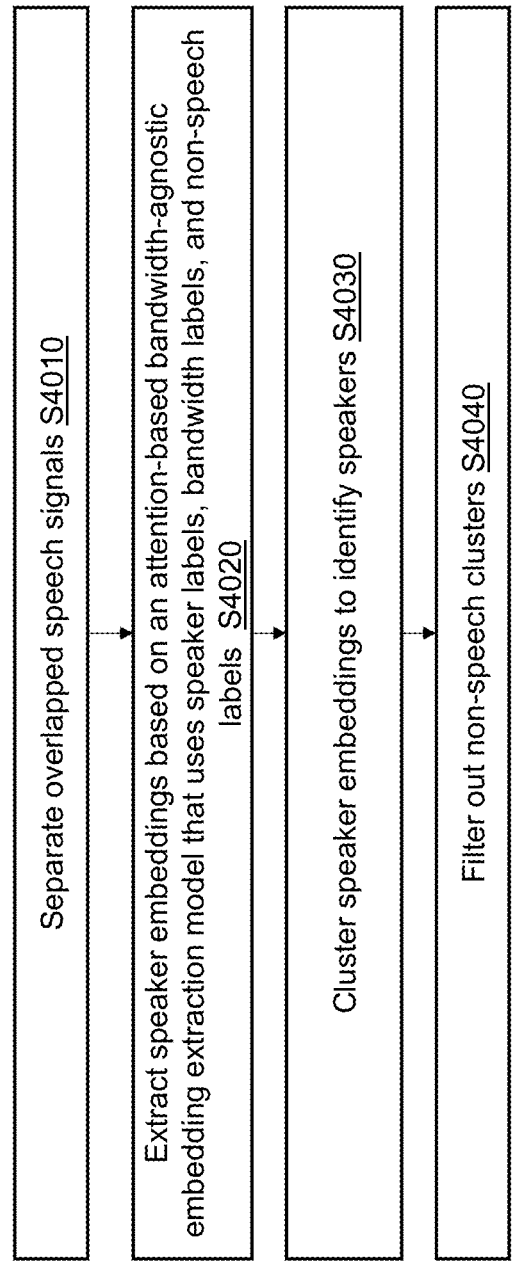
FIG. 21 is a flowchart illustrating a method of performing speaker diarization according to other embodiments.

FIG. 21 is a flowchart illustrating a speaker diarization process without using a speech activity detection process.

Operation S4010 may be substantially the same as operation S1020 and therefore redundant descriptions will be omitted.

In operation S4020, the processor 1020 may extract speaker embeddings from speech signals using an attention-based bandwidth-agnostic embedding extraction model. Among past speech segments, the processor 1020 may identify speech segments having the same speaker identity and the same bandwidth as those of a current speech segment at a current processing time. The processor 1020 may assign the same speaker label and the same bandwidth label to the past speech segments having the same speaker identity and the same bandwidth identity as the current speech segment, respectively. The processor 1020 may assign a first value (e.g., value 1 as shown in FIG. 20) to the past speech segments having the same speaker identity and the same bandwidth identity as the current speech segment. The processor 1020 may assign a second value (e.g., value 0 as shown in FIG. 20) to the past speech segments having different speaker labels and a different bandwidth label from the current speech segment. Additionally, the processor 1020 may assign the second value to non-speech segments (NS) if a speaker label at the current processing time is not NS, and may assign the first value (e.g., value 1) to the NS segments if the speaker label at the current processing time is NS. The processor 1020 may set or adjust soft attention weights of the attention-based bandwidth-agnostic embedding extraction model, to attend to the past speech segments having the first value, and not to attend to the past speech segments having the second value. Based on the loss function according to equation (1), the processor 1020 may minimize differences between speaker embeddings from a narrowband speech signal and a wideband speech signal from the same speaker and may maximize differences between speaker embeddings from different speakers.

In operation S4030, the processor 1020 may iteratively cluster the speaker embeddings based on vector similarities or vector dissimilarities between all pairs of the speaker embeddings to identify the speaker embeddings that correspond to the same speaker identities. For example, the processor 1020 may use an agglomerative hierarchical clustering (AHC) method to cluster the speaker embeddings.

The processor 1020 may iteratively perform the clustering until the lowest dissimilarity score becomes higher than a preset dissimilarity threshold, or the number of clusters becomes a present number, which represents the number of speakers in the audio signal. When the number of speakers is known, or the processor 1020 is capable of determining the number of speakers from the audio signal, the processor 1020 may stop clustering when the number of clusters becomes the number of speakers. The processor 1020 may otherwise stop clustering when the lowest dissimilarity score becomes higher than a preset dissimilarity threshold.

In operation S4040, the processor 1020 may filter out non-speech clusters among the speech clusters generated in operation S4030. The memory 1030 may store a non-speech representative vector. The processor 1020 may compute vector similarity scores between the non-speech representative vector and speaker representative vectors of each of the speaker clusters generated in operation S4030. If a vector similarity score of a speaker cluster is larger than a predetermined threshold, the processor 1020 may identify the speaker cluster as a non-speech cluster and may filter out the non-speech cluster.

Operations S4010-S4040 may be performed by at least one processor included in any type of electronic device, for example, a smartphone, a laptop computer, a personal computer (PC), a smart television, a server, and the like. For example, some or all of S4010-S4040 may be performed by the user device 110 or the server 140 shown in FIG. 7.

FIG. 22 are views illustrating examples of an electronic apparatus performing speaker diarization according to various embodiments of the disclosure.

As shown in FIG. 22, the electronic apparatus may be implemented as a smartphone 1001, a tablet personal computer (PC) 1002, a laptop 1003, or a server 1004.

The electronic apparatus may receive an audio signal from an external device, or detect the audio signal using a microphone mounted in the electronic apparatus. In an embodiment, the electronic apparatus may support an audio or video conference, and may receive or detect an audio signal via an audio or video conference application of the electronic apparatus. The audio signal may be a meeting recording or a voicemail. The electronic apparatus may identify one or more speakers of speech segments in the audio signal, through operations S110-S170, operations S210-S250, operations S310-5350, or operations S410-S440. The electronic apparatus may perform signal processing on speech clusters corresponding to different speakers in a one-to-one relationship, separately or individually to effectively reduce noise and improve signal quality for each of the speech clusters.

The embodiments of the disclosure described above may be written as computer executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to the electronic device 1000, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The above described method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of the server.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar bandwidth is used. Also, as used herein, the terms "has," "have," "having," or the like are intended to be open-ended terms. Further, the phrase "based on" is intended to mean "based, at least in part, on" unless explicitly stated otherwise.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

What is claimed is:

1. An apparatus for processing speech data, the apparatus comprising:
   a memory storing instructions; and
   a processor configured to execute the instructions to:
      separate an input speech into speech signals;
      identify a bandwidth of each of the speech signals;
      obtain speaker embeddings from each of a plurality of different speech embedding extraction models by inputting the speech signals having different bandwidths to the different speech embedding extraction models, wherein at least one neural network of each of the plurality of different speech embedding extraction models is trained based on the different bandwidths;
      cluster the speaker embeddings for each of the different bandwidths separately, to obtain bandwidth-dependent embedding clusters for each of the different bandwidths; and
      combine the bandwidth-dependent embedding clusters based on a vector dissimilarity between the bandwidth-dependent clusters, to obtain cross-bandwidth embedding clusters as speaker clusters, each of the speaker clusters corresponding to a speaker identity,
   wherein each of the plurality of different speech embedding extraction models comprises a plurality of frame-level layers, a pooling layer, a plurality of segmentation-level layers, and an output layer; and
   wherein the processor is further configured to obtain the speaker embeddings by inputting bandwidth information to one of the plurality of frame-level layers, and to the plurality of segment-level layers.

2. The apparatus of claim 1, wherein the processor is further configured to execute the instructions to:
   cluster the speaker embeddings based on a vector dissimilarity between a plurality of pairs of the speaker embeddings until the vector dissimilarity becomes greater than a predetermined threshold or a number of clusters becomes a predetermined number.

3. The apparatus of claim 1, wherein the different bandwidths comprise a first bandwidth and a second bandwidth, and the plurality of different speech embedding extraction models comprise a first model trained based on the first bandwidth, and a second model trained based on the second bandwidth,
   wherein the processor is further configured to execute the instructions to:
   obtain the speaker embeddings corresponding to the first bandwidth, and the speaker embeddings corresponding to the second bandwidth, from the first model and the second model, respectively;
   cluster the speaker embeddings corresponding to the first bandwidth, and the speaker embeddings corresponding to the second bandwidth, separately, to obtain first-bandwidth clusters and second-bandwidth clusters, respectively; and
   combine the first-bandwidth clusters and the second-bandwidth clusters based on the vector dissimilarity between the first-bandwidth clusters and the second-bandwidth clusters, to obtain the cross-bandwidth embedding clusters.

4. The apparatus of claim 1, wherein:
   the plurality of frame-level layers are configured to process the speech signals at a frame-level, to provide frame-level representations of the speech signals;
   the pooling layer is configured to aggregate the frame-level representations over a segment, based on a deviation of the frame-level representations;
   the plurality of segmentation-level layers are configured to process the frame-level representations at a segmentation level to provide segmentation-level representations of the speech signals and the speaker embeddings; and
   the output layer is configured to output a speaker identification of each of the segmentation-level representations of the speech signals.

5. The apparatus of claim 1, wherein the plurality of frame-level layers form a convolutional neural network or a time-delayed neural network.

6. The apparatus of claim 1, wherein the speaker embeddings are output from a last hidden layer of the plurality of segmentation-level layers that immediately precedes the output layer.

7. The apparatus of claim 1, wherein the output layer uses a softmax activation function.

8. The apparatus of claim 1, wherein the identified bandwidth comprises a first bandwidth and a second bandwidth,
   wherein the processor is further configured to execute the instructions to:
   while extracting the speaker embeddings from the speech signals, input information of the first bandwidth to the at least one neural network when the speech signals of the first bandwidth are input to the at least one neural network, and input information of the second bandwidth to the at least one neural network when the speech signals of the second bandwidth are input to the at least one neural network.

9. A method for processing speech data, the method comprising:

separating an input speech into speech signals;

identifying a bandwidth of each of the speech signals;

obtaining speaker embeddings from each of a plurality of different speech embedding extraction models by inputting the speech signals having different bandwidths to the different speech embedding extraction models, wherein at least one neural network of each of the plurality of different speech embedding extraction models is trained based on the different bandwidths;

clustering the speaker embeddings for each of the different bandwidths separately, to obtain bandwidth-dependent embedding clusters for each of the different bandwidths;

combining the bandwidth-dependent embedding clusters based on a vector dissimilarity between a plurality of pairs of the bandwidth-dependent clusters, to obtain cross-bandwidth embedding clusters as speaker clusters, each of the speaker clusters corresponding to a speaker identity, wherein the at least one neural network comprises a plurality of frame-level layers, a pooling layer, a plurality of segmentation-level layers, and an output layer, and wherein the obtaining of the speaker embeddings comprises: inputting bandwidth information to one of the plurality of frame-level layers, and to the plurality of segment-level layers.

10. The method of claim 9, the identifying the speaker comprises:

identifying the speaker of each of the speaker clusters based on a vector dissimilarity between a plurality of pairs of the speaker embeddings until the vector dissimilarity becomes greater than a predetermined threshold or a number of clusters becomes a predetermined number.

11. The method of claim 9, wherein the different bandwidths comprise a first bandwidth and a second bandwidth, and the plurality of different speech embedding extraction models comprise a first model trained based on the first bandwidth, and a second model trained based on the second bandwidth, wherein the extracting the speaker embeddings further comprises:

obtaining the speaker embeddings corresponding to the first bandwidth, and the speaker embeddings corresponding to the second bandwidth, from the first model and the second model, respectively;

clustering the speaker embeddings corresponding to the first bandwidth, and the speaker embeddings corresponding to the second bandwidth, separately, to obtain first-bandwidth clusters and second-bandwidth clusters, respectively; and combining the first-bandwidth clusters and the second-bandwidth clusters based on the vector dissimilarity between a plurality of pairs of the first-bandwidth clusters and the second-bandwidth clusters, to obtain the cross-bandwidth embedding clusters.

12. The method of claim 9, wherein the identified bandwidth comprises a first bandwidth and a second bandwidth, wherein the extracting the speaker embeddings comprises:

while extracting the speaker embeddings from the speech signals, inputting information of the first bandwidth to the at least one neural network when the speech signals of the first bandwidth are input to the at least one neural network, and inputting information of the second bandwidth to the at least one neural network when the speech signals of the second bandwidth are input to the at least one neural network.

* * * * *